United States Patent

Post

[15] 3,644,898

[45] Feb. 22, 1972

[54] INFORMATION ASSOCIATION THROUGH LOGICAL FUNCTIONS DERIVED FROM LANGUAGE

[72] Inventor: Paul B. Post, South Norwalk, Conn.

[73] Assignee: United Aircraft Corporation, East Hartford, Conn.

[22] Filed: Apr. 30, 1970

[21] Appl. No.: 33,807

[52] U.S. Cl. ........ 340/172.5

[51] Int. Cl. ........ G06f 7/30, G06f 15/40

[58] Field of Search ........ 340/172.5

[56] References Cited

UNITED STATES PATENTS

| | | | |
|---|---|---|---|
| 3,374,486 | 3/1968 | Wanner | 340/172.5 |
| 3,293,619 | 12/1966 | Luhn | 340/172.5 |
| 3,284,779 | 11/1966 | Lee et al. | 340/172.5 |
| 3,350,695 | 10/1967 | Kaufman | 340/172.5 |
| 3,376,555 | 4/1968 | Crane et al. | 340/172.5 |

*Primary Examiner*—Paul J. Henon
*Assistant Examiner*—Jan E. Rhoads
*Attorney*—Melvin Pearson Williams

[57] ABSTRACT

In a data-processing apparatus of a new type, information consists of a plurality of triplets, each of which is a group of three words in ordinary language, selected on the basis of their mutual semantic relevance. The apparatus does not store the words themselves, but stores, for each triplet, a logical function of the internally encoded representations of the words. For any triplet, the three words are entered into the processor where each word is randomly encoded into a plurality of distinct bits, each associated with a distinct memory cell in a large collection of cells. A count is made by logical apparatus associated with each cell, and where a count of three is achieved by the successive entrance into the processor of the three words in a triplet, that cell is set into a logical 1 state and becomes a permanent part of the memory of the apparatus. Inquiry into the apparatus is based on providing two words, the apparatus in turn supplying the third word in the case where the two words have previously been entered as part of a triplet, as described above. Exemplary data handling and control apparatus is also disclosed.

16 Claims, 30 Drawing Figures

INVENTOR
PAUL B. POST

BY Melvin Pearson Williams

ATTORNEY

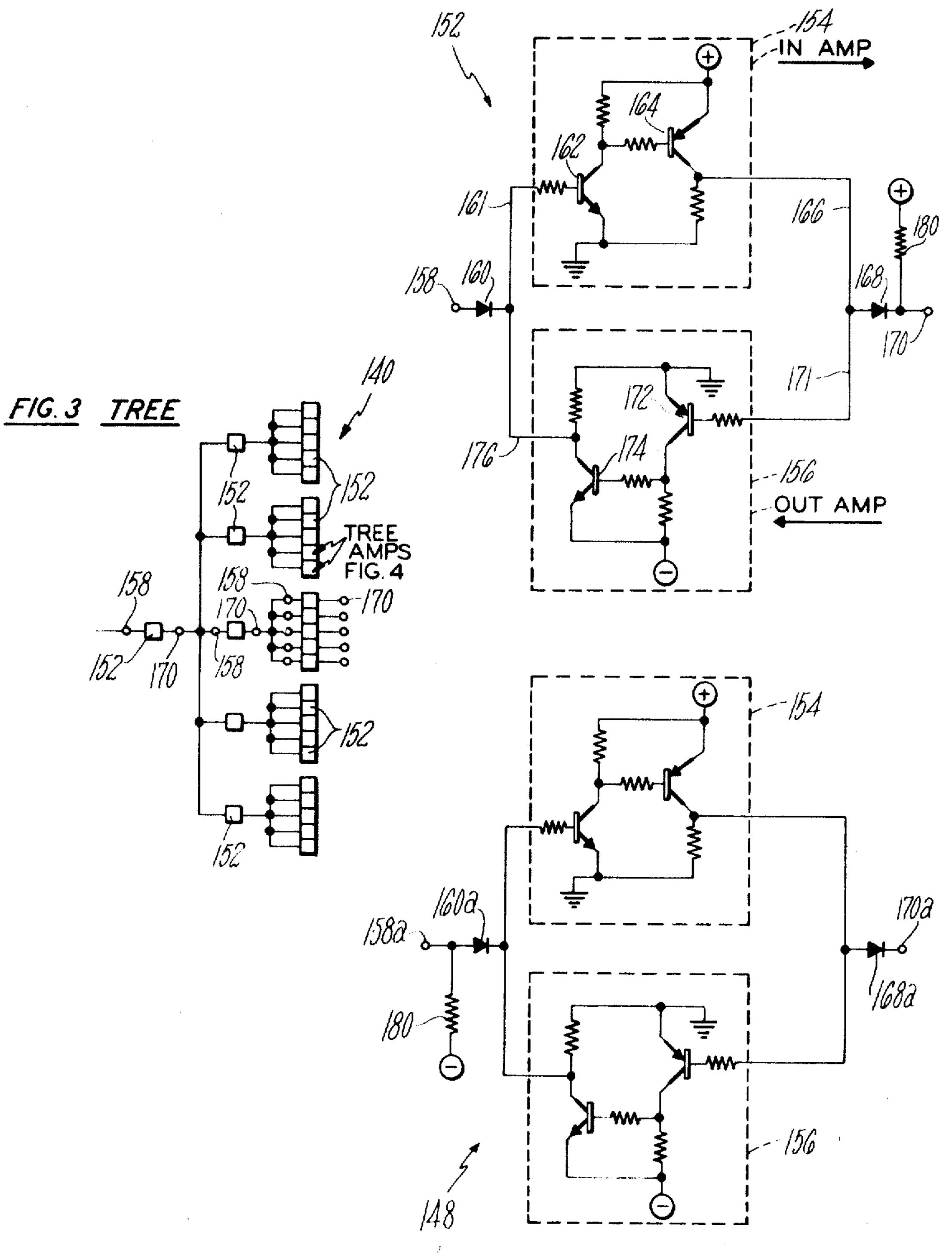
FIG. 3 TREE, FIG. 4 TREE AMP, FIG. 5 MEM AMP

FIG. 8 CONTROLS
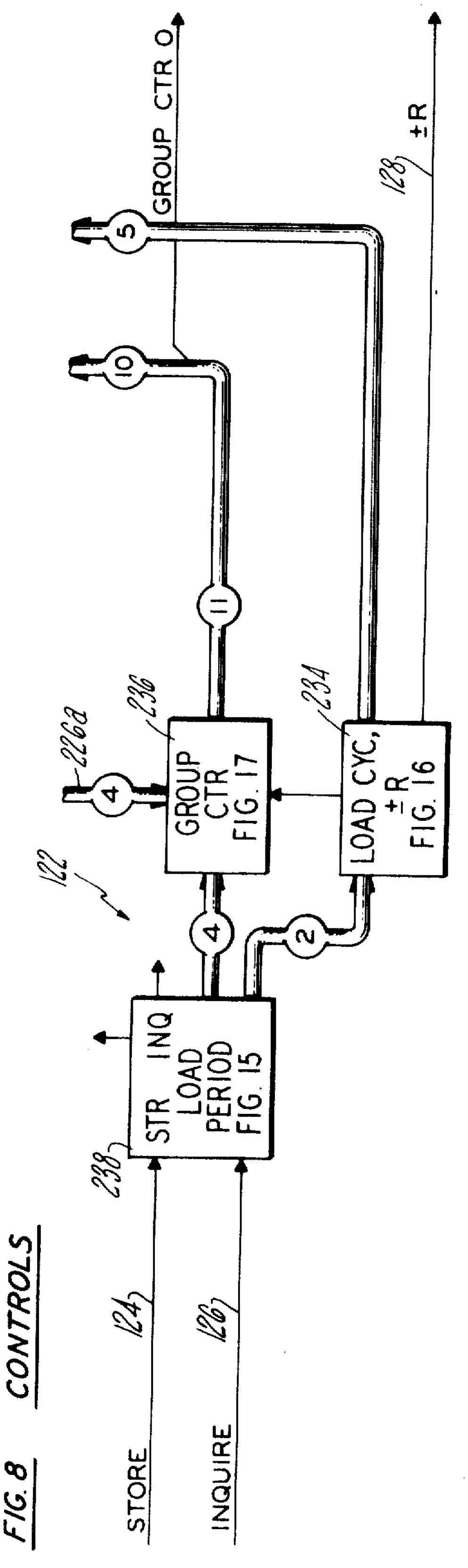
FIG. 6 LOGICAL MEMORY CELL
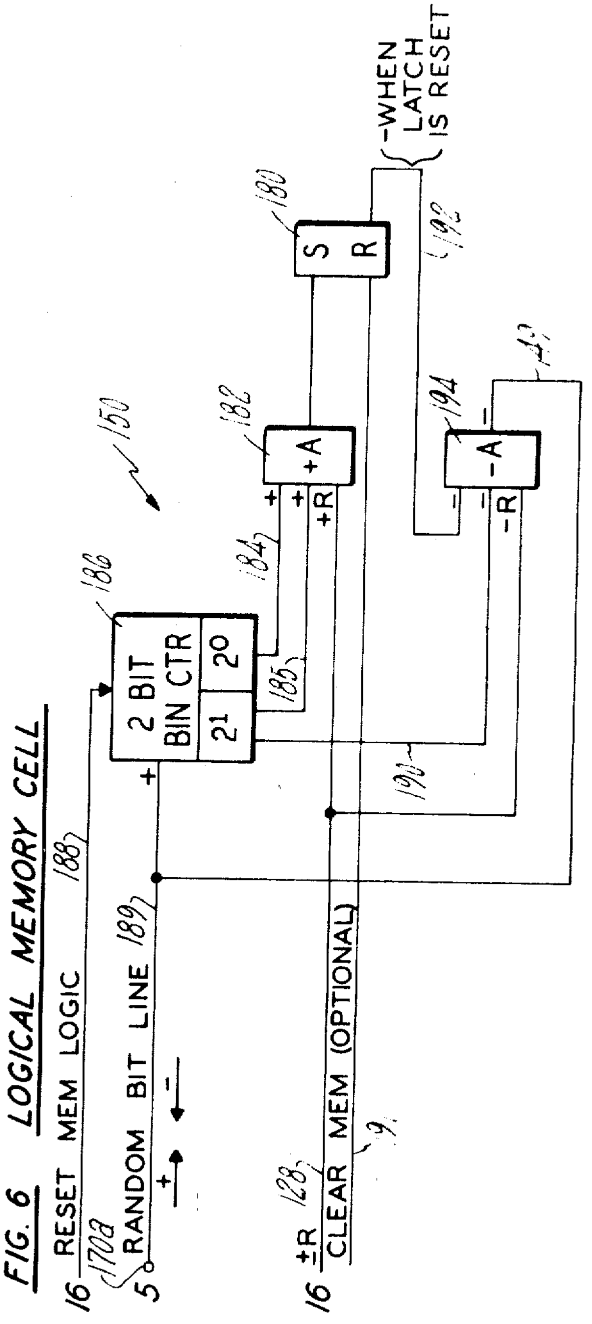

FIG. 7 INPUT CIRCUITRY
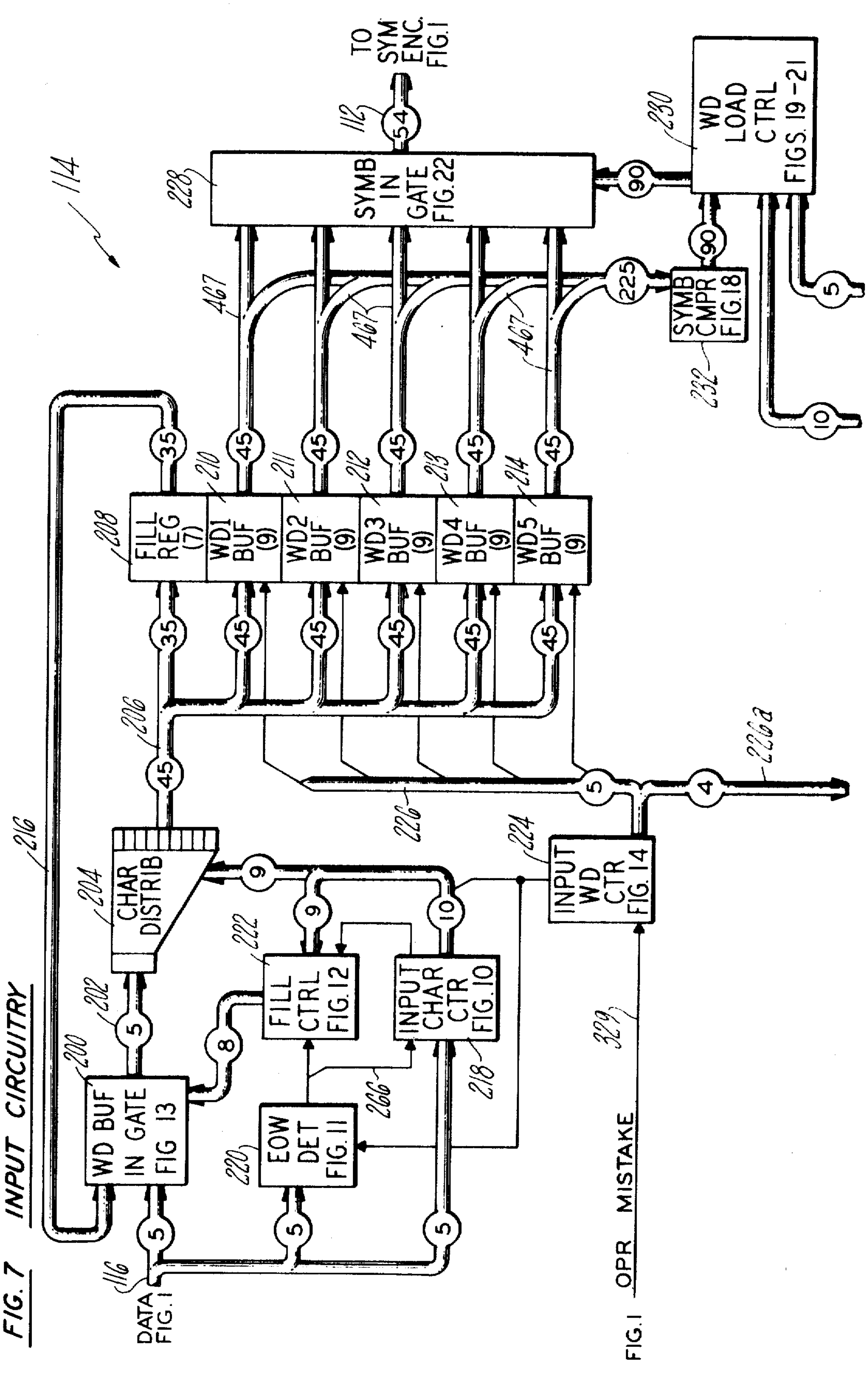

PATENTED FEB 22 1972
3,644,898
SHEET 06 OF 23
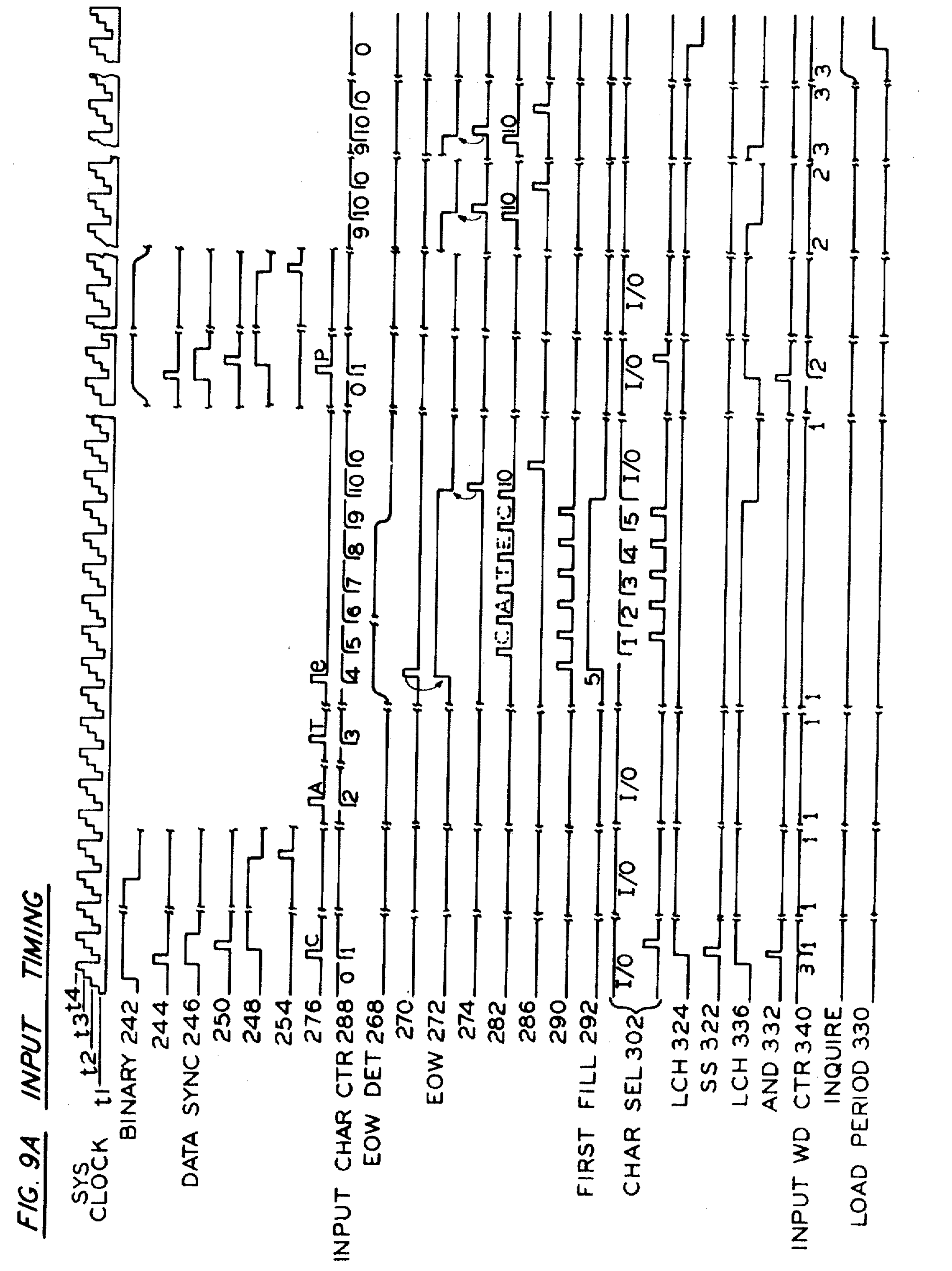
FIG. 9A INPUT TIMING

FIG. 9B MEMORY LOAD & OUTPUT TIMING
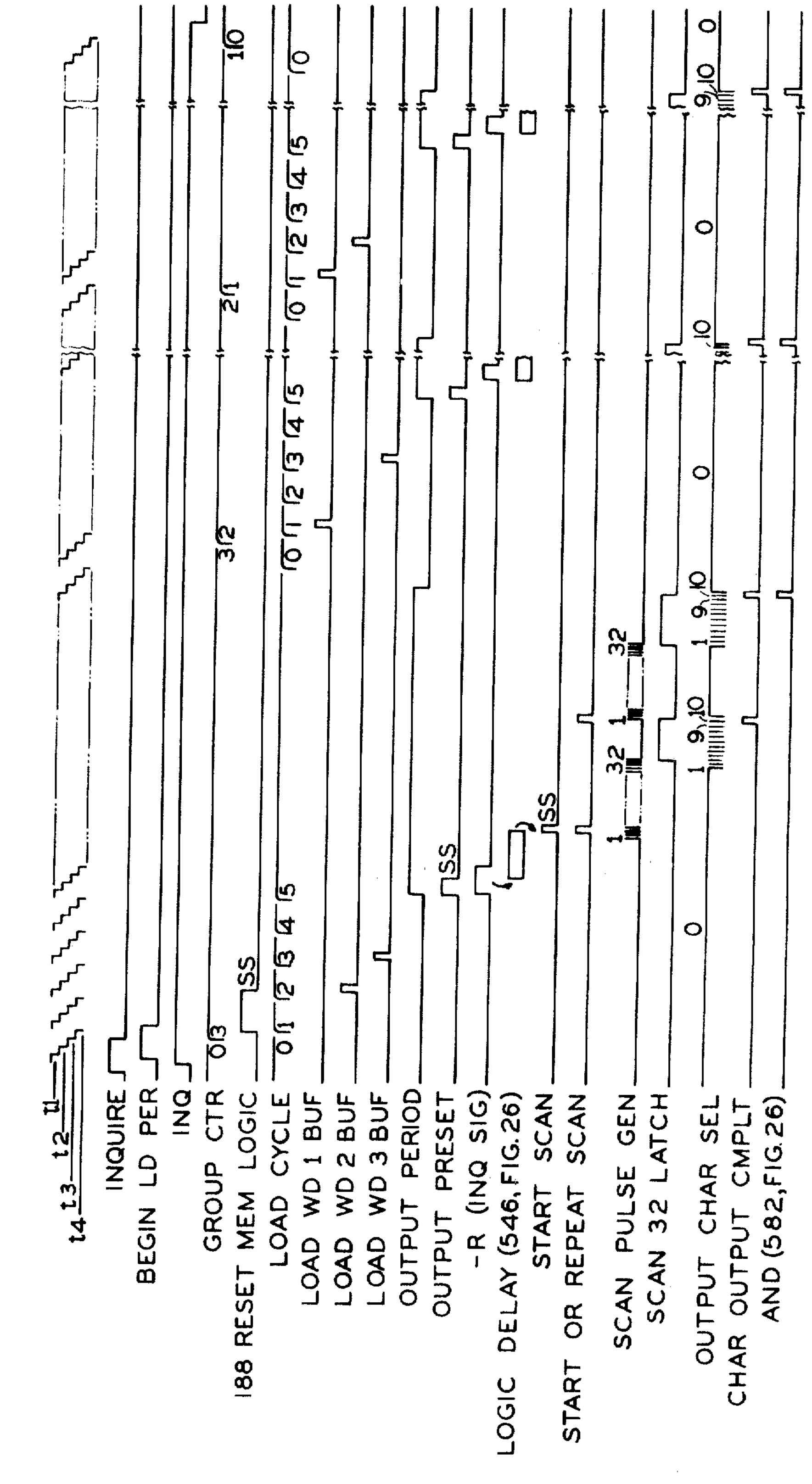

FIG. 10 INPUT CHAR CTR
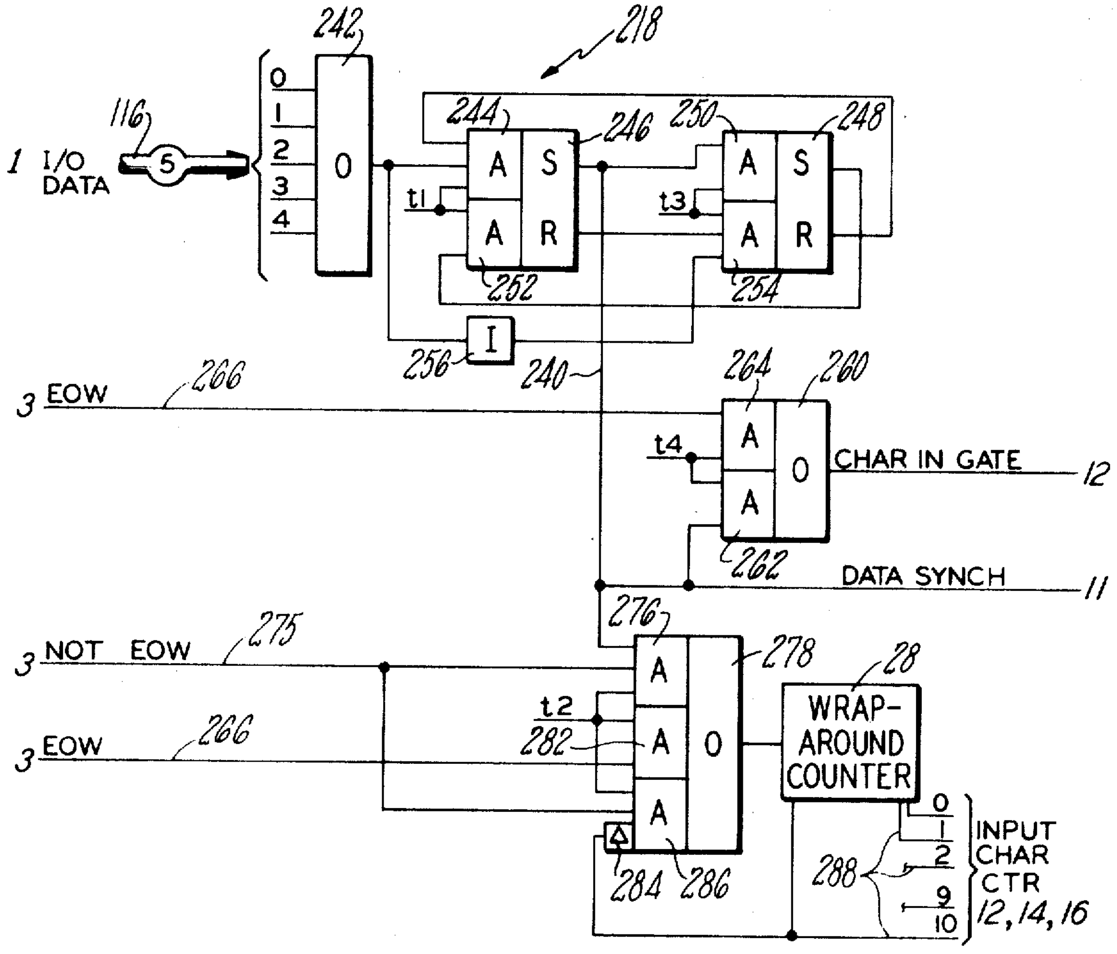
FIG. 11 END OF WD DET
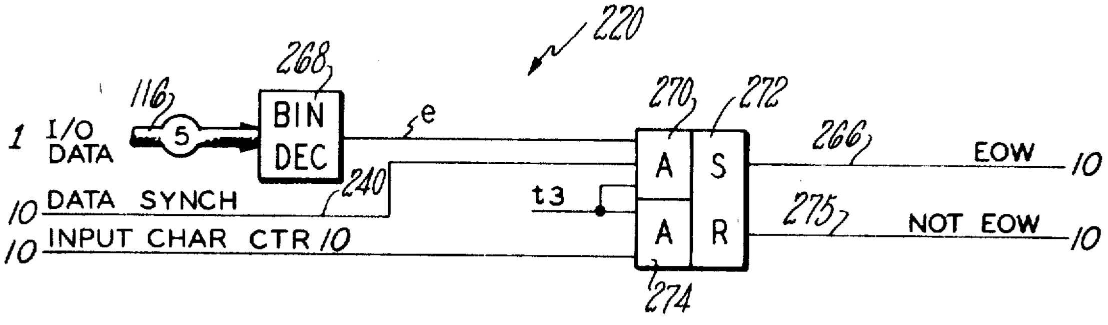

FIG. 12 FILL CONTROL
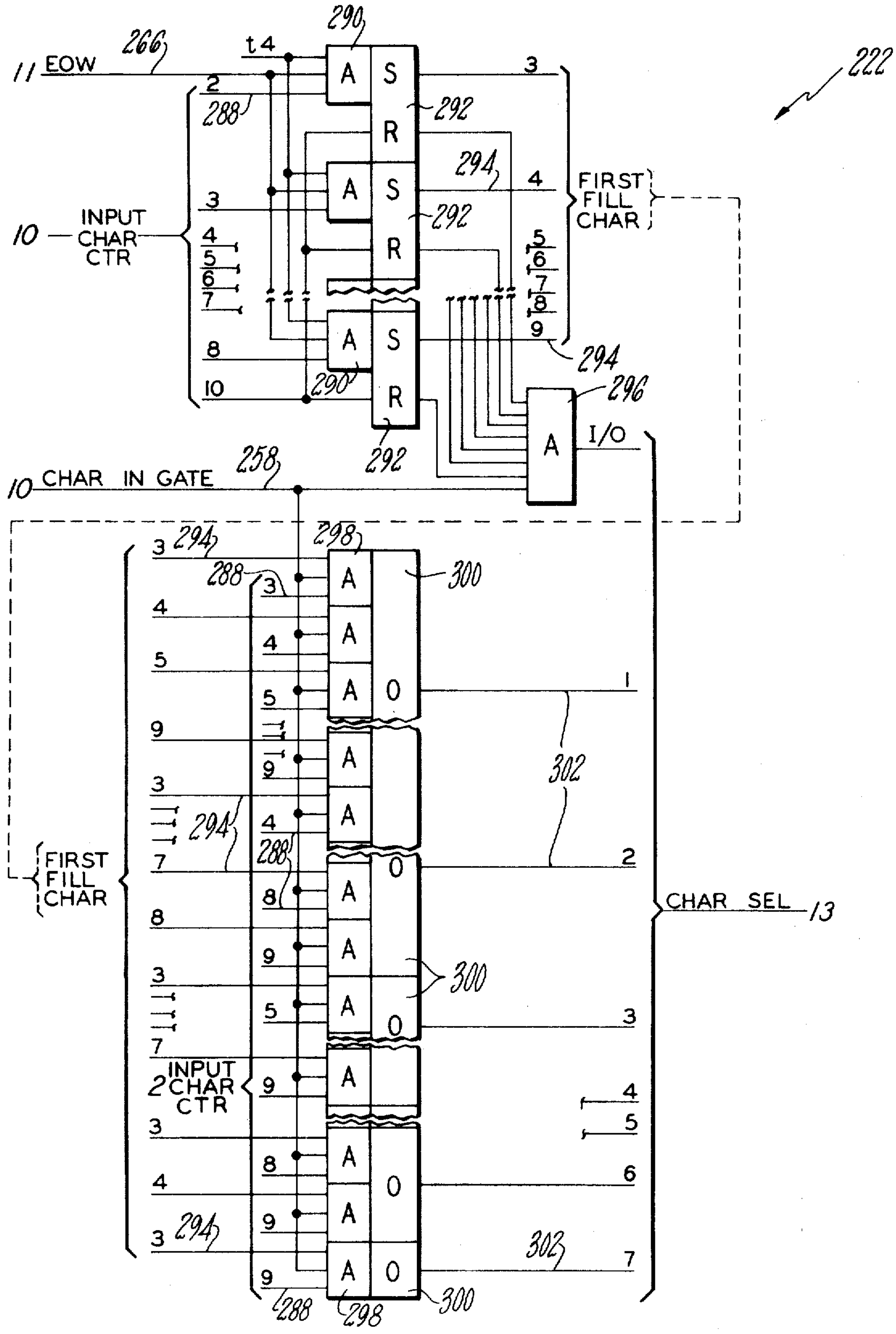

FIG. 13 WORD BUFFER INPUT GATE
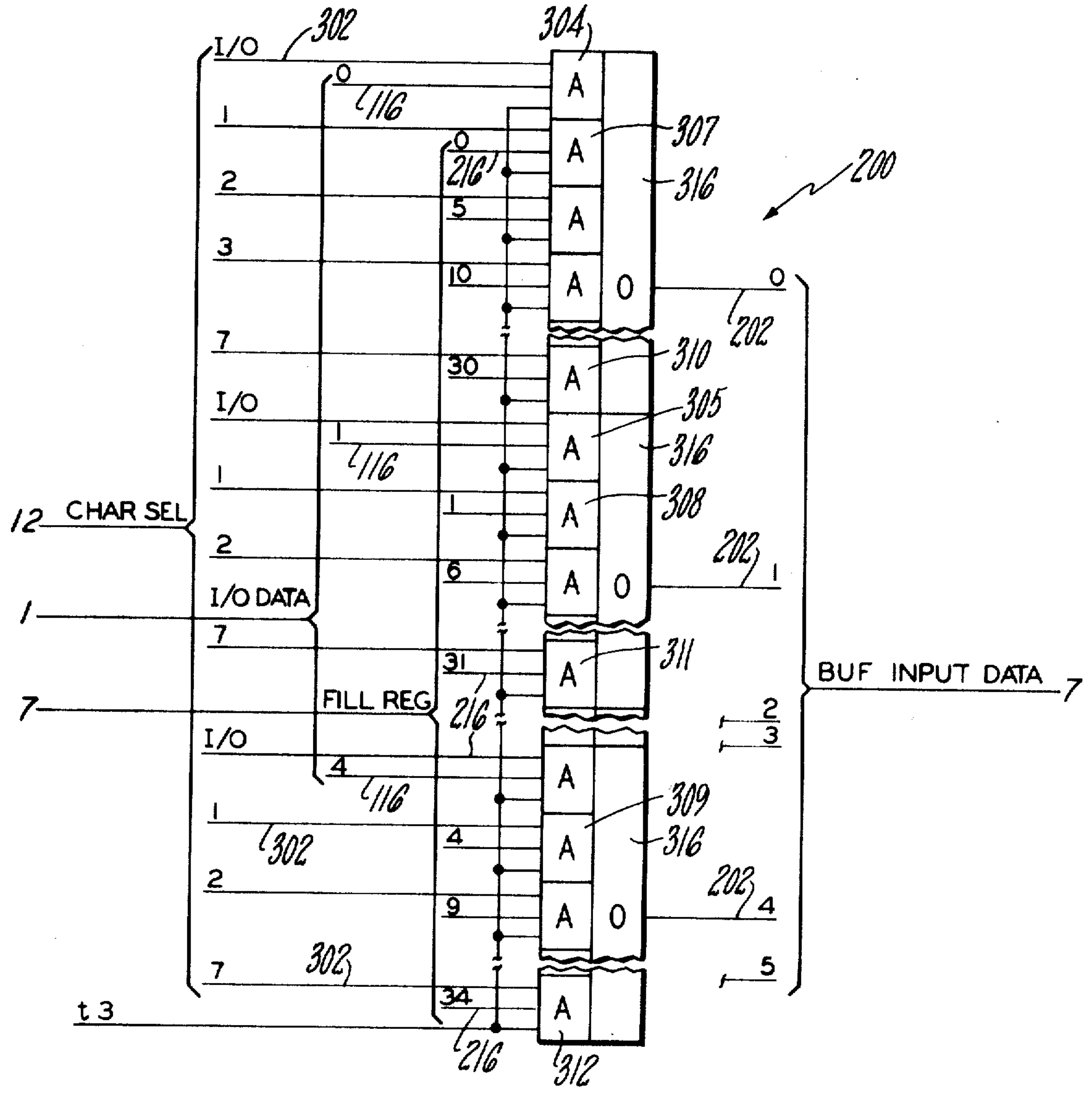
FIG. 14 INPUT WD CTR
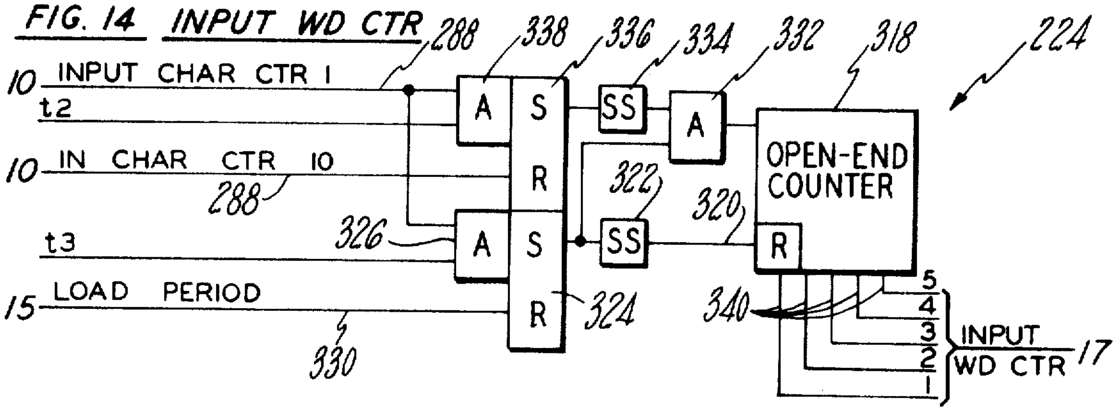

FIG. 18 SYMBOL COMPARE

FIG. 19 WD LOAD CTRL

FIG. 20 LOAD WORD 1 – CHARACTER 1 – (CYCLE 1)

FIG. 21 LOAD WORD 1 — CHARACTER 1 — (CYCLE 4)

FIG. 22 SYMBOL INPUT GATE

FIG. 24 SYMBOL RESPONSE REGS.
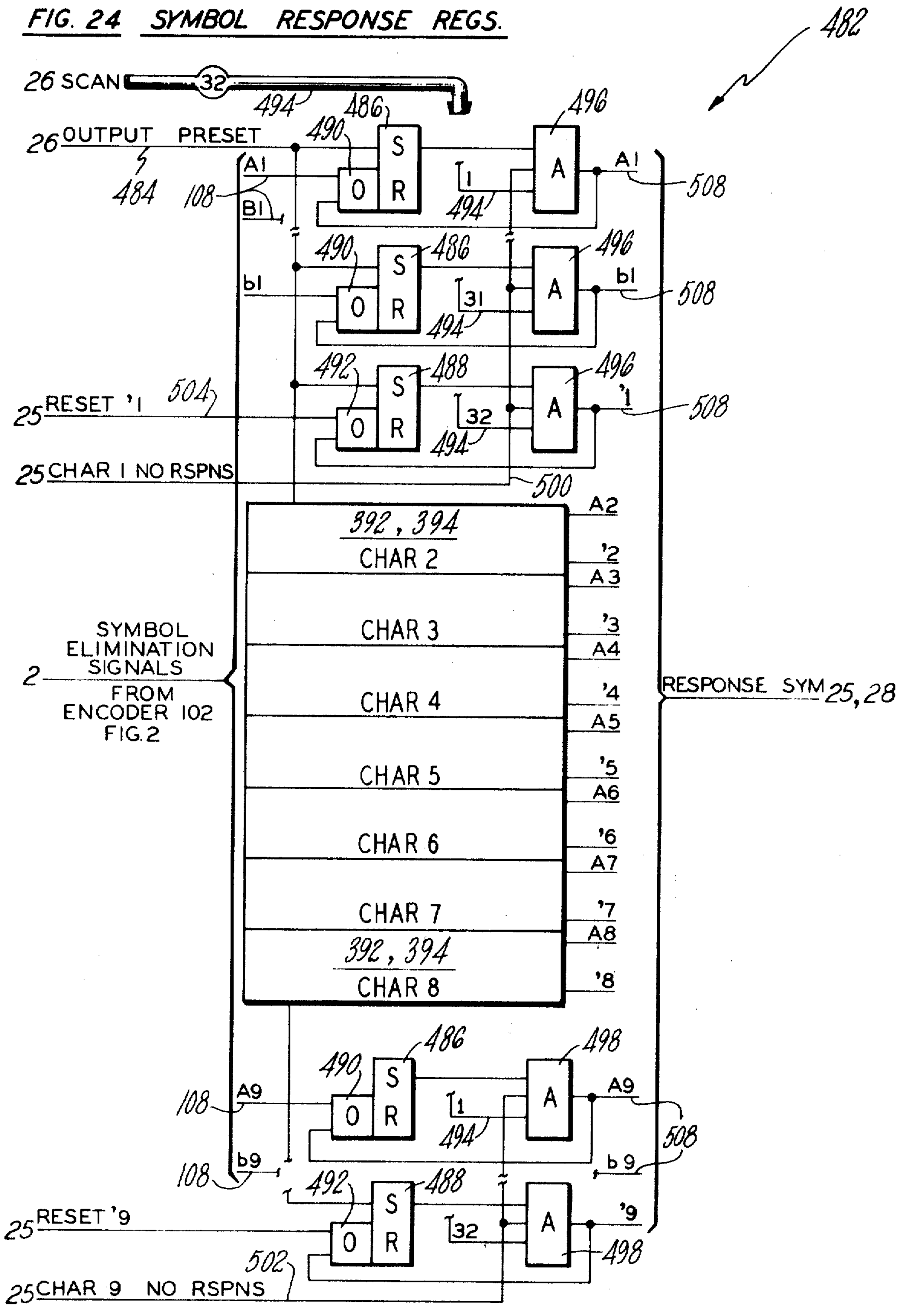

FIG. 25 RESPONSE TEST
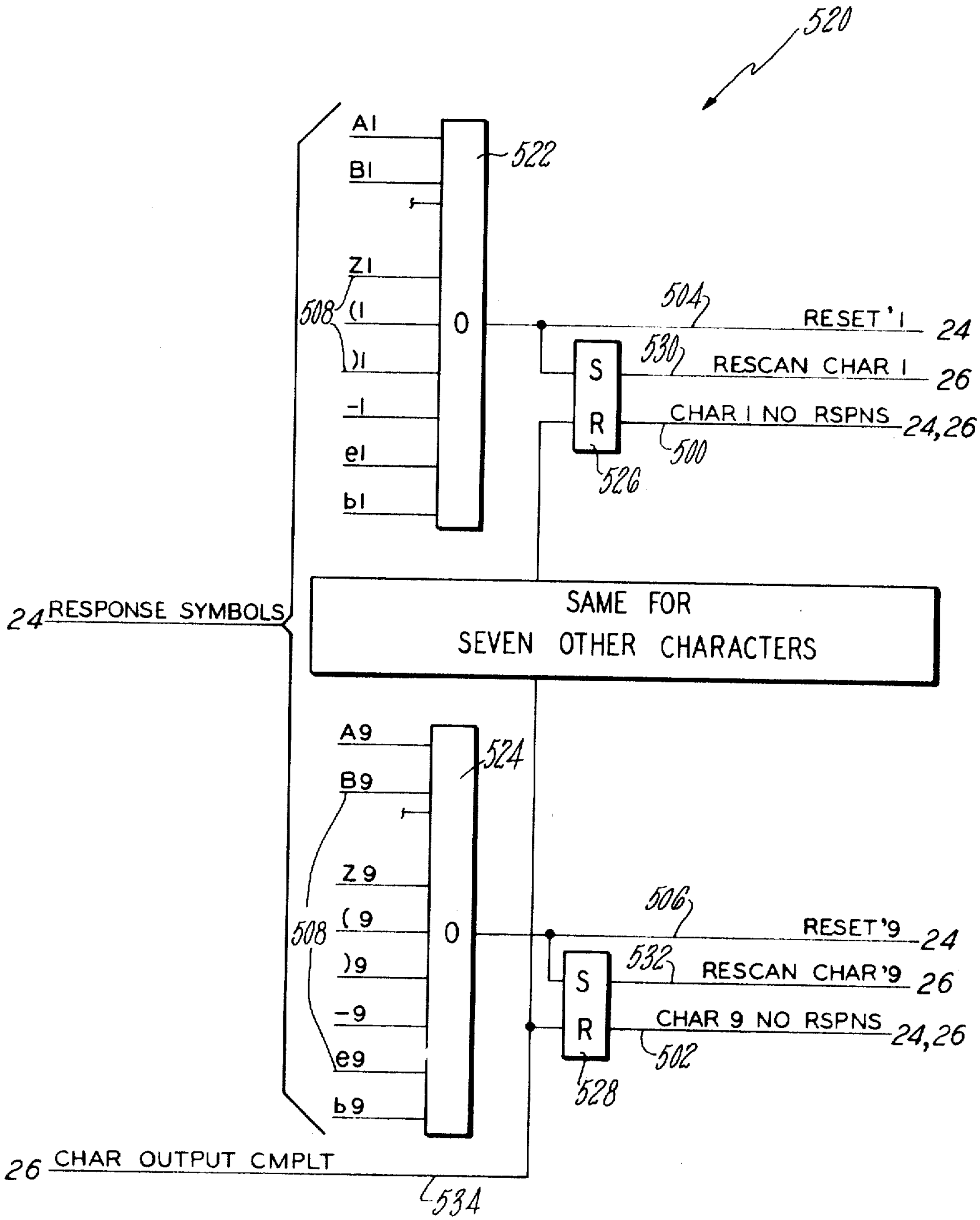

FIG. 26 OUTPUT PERIOD & SCAN
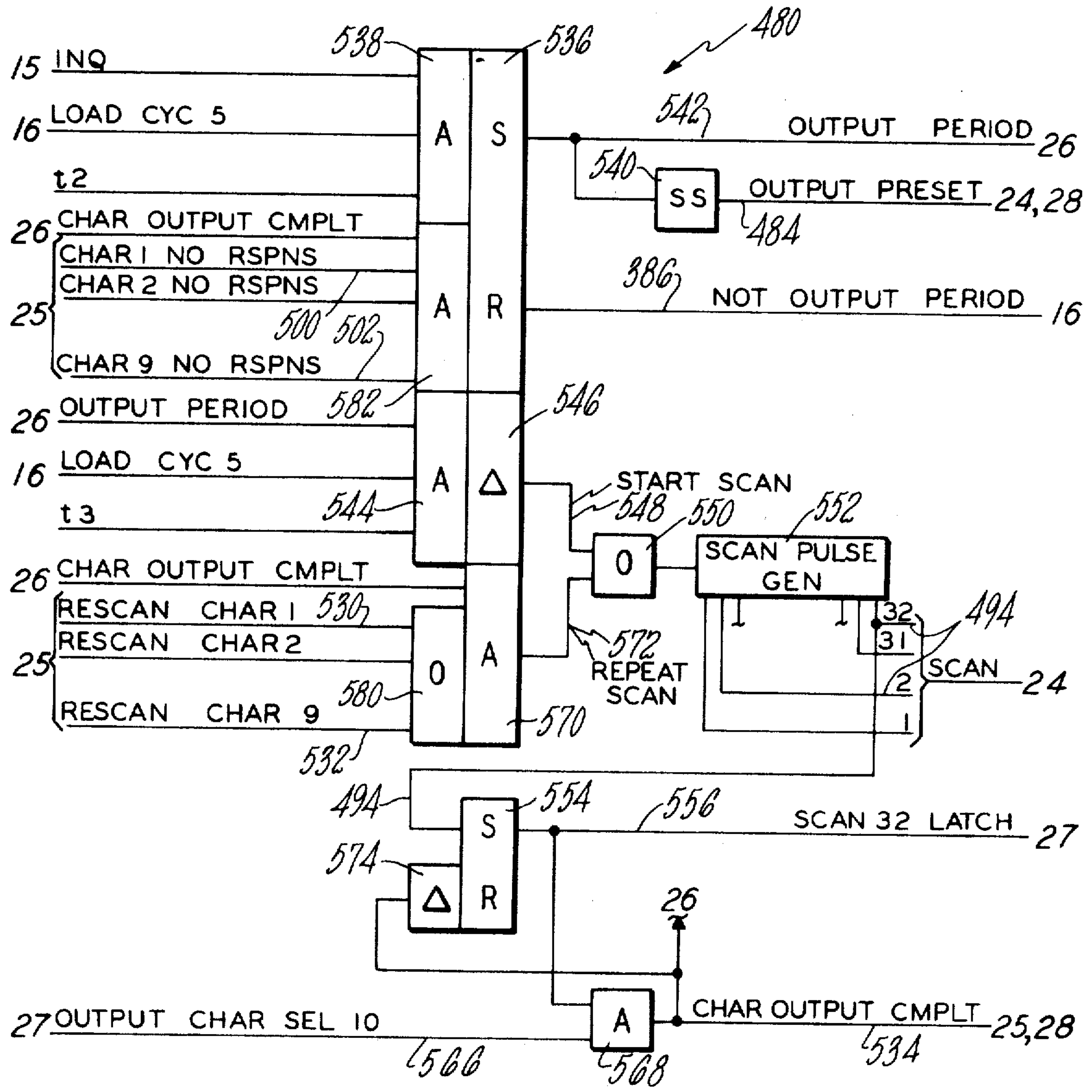
FIG. 27 OUTPUT CLK & CHAR SELECT
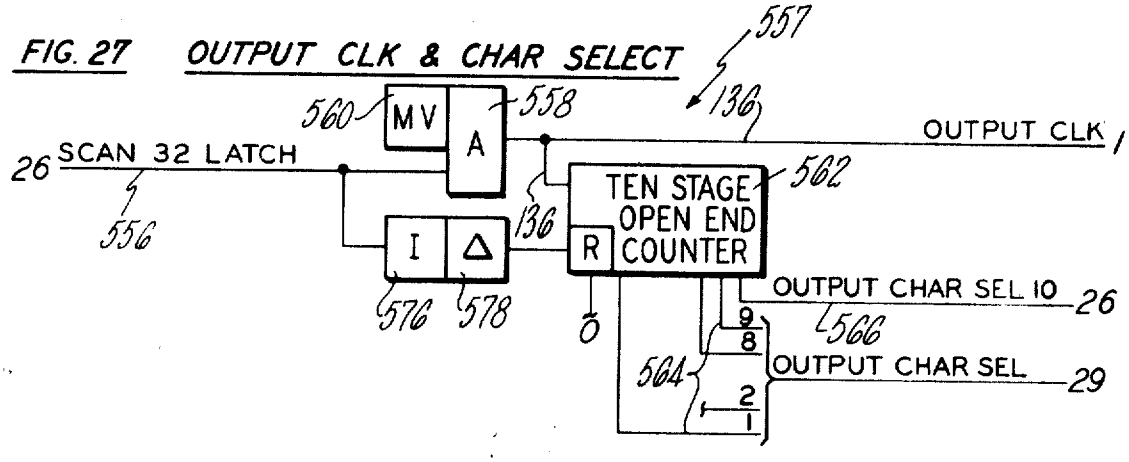

FIG. 28 CHAR ENCODE & REGS
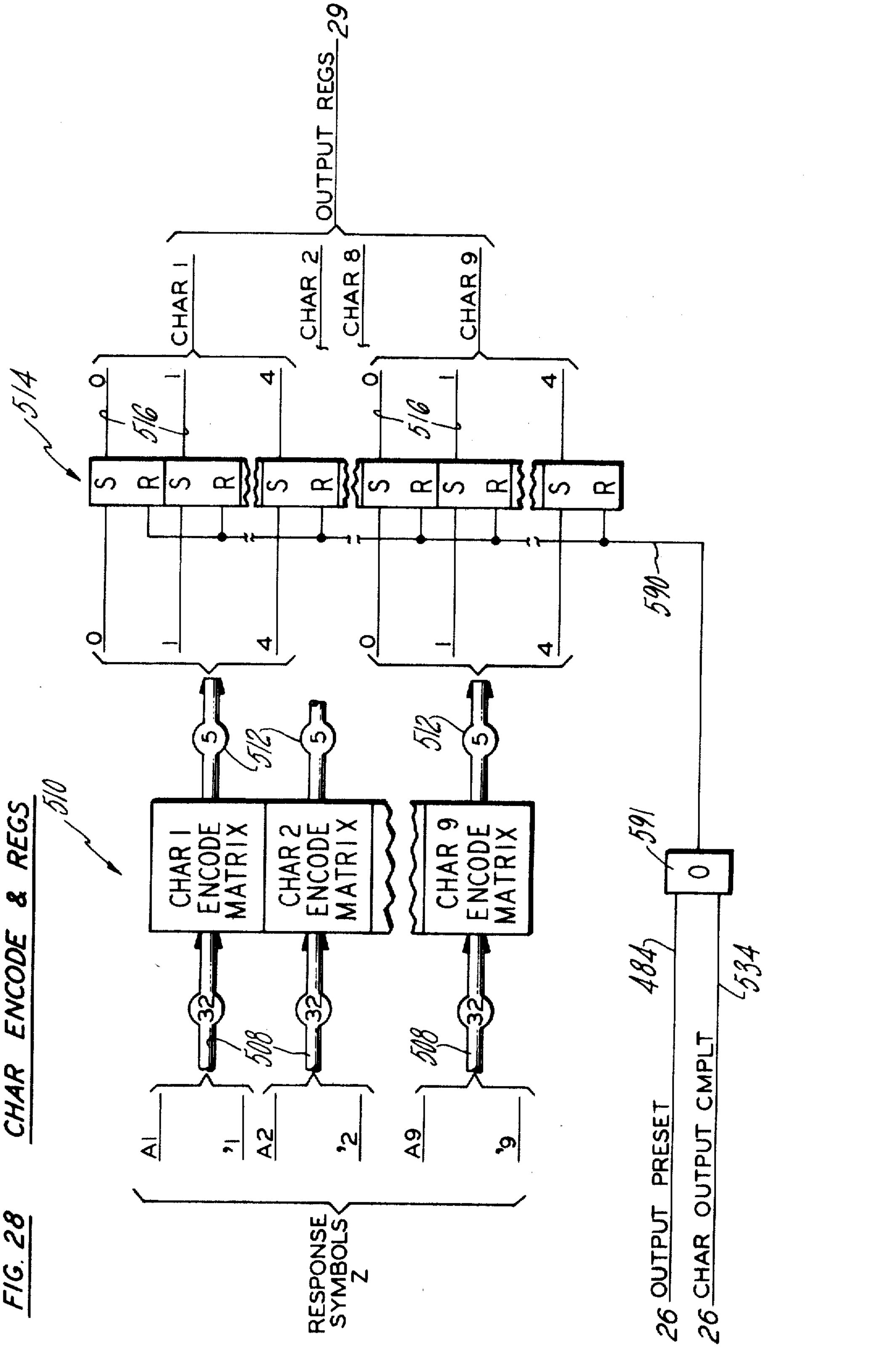

FIG. 29 OUTPUT CHAR GATES
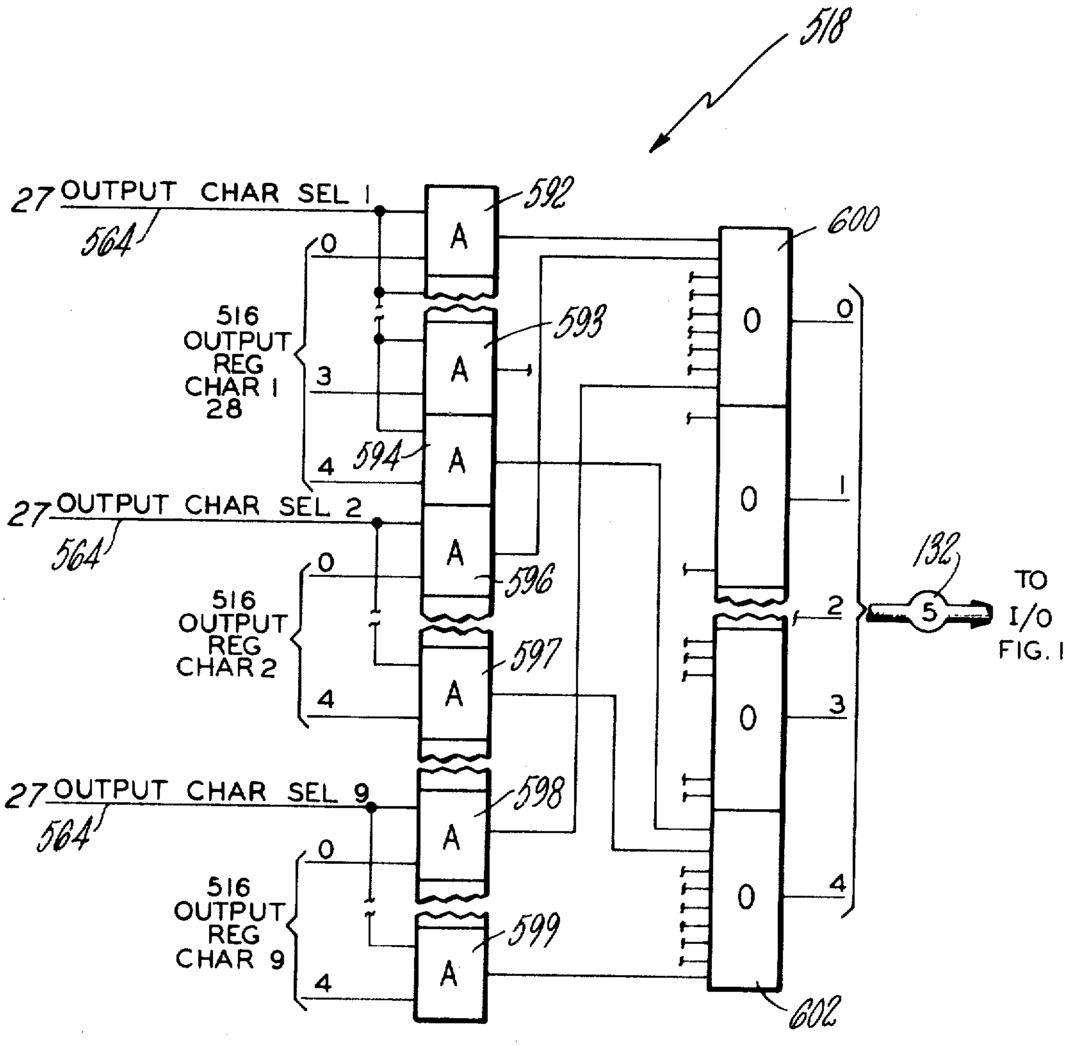

INFORMATION ASSOCIATION THROUGH LOGICAL FUNCTIONS DERIVED FROM LANGUAGE

BACKGROUND OF THE INVENTION

1. Field of Invention

This invention relates to data handling and more particularly to word association apparatus.

2. Description of the Prior Art

In the data-handling art, there are many numerical and simple logical functions which may readily be performed by commercially available data processing systems. This type of data processing is limited to the performance of routine tasks (such as data moving, arithmetic and logic operations) with known data items so as to derive information which bears a known task relationship to the parameters used in performing the simple tasks.

Such data-processing systems do not handle information in a manner that adequately meets long-range objectives in information retrieval, language processing, problem solving, and other areas of artificial intelligence. Existing systems lack the ability to recognize and retrieve promptly whatever information may be useful for processing a given task, especially when different terms are used to express similar concepts and relationships. Existing systems also lack general and efficient faculties for concept information, induction, discourse, conjecture, drawing analogies, etc.

For such tasks, powerful tools are available: large storage capacity, high-processing speed, microelectronics, and a host of programming languages. Progress, nevertheless, has been slow. In the prior art, sophisticated operations are sometimes achieved as a result of complex combinations of simple tasks. Yet each attempt to expand or generalize machine capabilities usually leads to a time-consuming and expensive recasting of data structures. Too often a new input/output language must be developed, yet one can never be sure it is adequate, or that it will not soon become obsolete.

One of the specific functions required for cognitive data processing is the ability to make use of any and all stored information as the need arises. The more a system selectively takes advantage of past experience, the more successful it will be in handling new experiences. But the "need" for certain stored information must first be recognized as a function of the particular situation at hand. This can be accomplished through the perception of key elements and element combinations in the situation, but perception and recognition should occur even if the relevant information had been expressed in different terms when stored. In addition, a cognitive system should accept new information in a way that usually relates it to all of the stored information. When new information invalidates some old information, the latter must be modified or restructured without jeopardizing valid information. The same is true when the meanings of some elements are shifted, specialized, generalized, split, or combined with the passage of time.

To a large extent, the degree of success obtainable in the performance of such functions depends on the nature of the associative links with which elements of information are organized. When the links are few and rigid, the system can be expected to have limited capability. When associations are rich and dynamic, there is a greater chance of success. Evidently, a more general and flexible associative mechanism is needed by which patterns of relevance can be largely self-organized and self-maintained.

A customary approach in designing cognitive systems and programs is to begin by constructing a model that represents as closely as possible the appropriate information macrostructure, proceeding from the general to the specific. (Here the term "macrostructure" refers to an overall organization of the data to be handled by the system. Such macrostructures are the traditional means by which complex relationships are visualized, recorded, and communicated.) Using this approach, the designer proceeds to impose functional and associative links hierarchically and attempts to anticipate potential modes of adaptation.

It is quite possible, however, to choose the opposite direction for constructing an internal model. One could begin with a large number of elementary associations known to be relevant, and let the macrostructure be implied by the associated characteristics of the relata, rather than be predetermined. For example, a child learns about animals and their approximate groupings before he can be taught to view the animal kingdom taxonomically. In this case, the obvious differences between insects, fish, birds, and mammals readily imply the existence of at least four major groups. (Only later are spiders, bats, and dolphins pointed out to be special cases, and they are often remembered as such.) Another example appears in the learning of a native language, whereby grammar and syntax are universally inferred from simple instructions. Indeed, few people ever achieve an accurate conception of the structure of their native language.

Despite the apparent conciseness of information macrostructures, their use for general purposes of association may actually impede performance of the cognitive functions described above. In particular, it would be desirable if elements of information could be freely located, associated, modified, or otherwise processed without reference to a predetermined macrostructure.

SUMMARY OF THE INVENTION

The object of the present invention is to provide a data-processing system capable of dealing directly in associative relationships.

According to the present invention there is provided a model of semantic information that organizes itself in response to a large number of elementary associations which are supplied thereto. The elementary associations are supplied successively and in any order.

The system in accordance with the present invention receives for storage and reconstructs for retrieval such entities as words, technical terms, phrases, proper names, and other language groupings which may be appropriate for information retrieval, language processing, problem solving, etc.

In accordance with the present invention, the user of the system need not construct, map, program, or otherwise organize any model of the information to be handled by the system, beyond the specification of the elementary associations.

The system in accordance with the present invention is capable of responding to the entities selected for inquiry with whatever entity or entities are most relevant thereto. No sequential searching is required nor is any form of addressing involved.

In accordance further with the invention, elementary associations are supplied in the form of mutiplets (such as triplets) of mutually relevant words of ordinary language. Each word of a multiplet is encoded into a plurality of cells, forming a distinctive pattern in a very large array of cells. As each word is thus encoded, the resulting designations of cells are recorded at the respective cells, one word at a time. After cell designations are recorded in all relevant cells for all of the words in the multiplet, those cells designated as many times as there are words in the multiplet (that is, designated by all of the words in the multiplet) are set to a determinable condition, such as a logical state, representing permanent storage of the logical intersection of all encoded word patterns for the multiplet. These cells are called M cells. No other data pertaining to the multiplet is permanently stored. Inasmuch as the logical intersection comprises relatively few cells, economical storage is achieved.

In accordance further with the invention, additional multiplets are supplied and similarly encoded. The total number of M cells thus increases to a certain amount, depending on the number of multiplets supplied. Inasmuch as many of the M cells are shared by more than one multiplet, further storage economy is achieved.

In accordance with the invention, retrieval is accomplished by similarly encoding and registering designations of successive words in a smaller multiplet—one assumed to have sufficient information content so as to cause responses made upon inquiry therewith to be relevant. On inquiry, each cell which receives a designation from all of the words in the inquiry multiplet is examined by logical means. The state of its permanent memory then determines whether the cell is allowed to participate in formation of output words. For example, if the multiplets are triplets, two inquiry words are supplied and encoded. Those cells which are designated by both words, but which are not M cells, cannot logically belong to the encoded pattern of the third word of the triplet. Hence these cells are excluded from the process which forms output, or response, words.

In accordance with the invention in one form, words are related to cells of memory by a two-state process. The first stage converts a word into a simultaneous combination of distinct internal symbols selected from a set of symbols. In the disclosed embodiment, each symbol is defined according to an alphabetic (or special) character and according to the position at which the character appears in a word. As an example, the word "CAT" is made up of the three symbols C1, A2, and T3. In accordance with the invention in one form, the second stage translates (or converts) each symbol into a random or quasi-random, fixed, equipotential (that is, distributed) pattern of cells in the large array of memory cells. In the disclosed embodiment, encoding apparatus is provided that branches one line from each symbol into a large number of lines (625 in the embodiment herein) and then randomly ORs together each such line with similar lines (five are ORed in this embodiment) of other symbols. Thus, in the embodiment herein, the designation of any individual memory cell may result from any one of five distinct symbols.

In accordance further with the invention, the translation means comprises a bidirectional apparatus which is responsive to a signal of a first polarity propagating toward memory to cause the designations of the related memory cells either for storage or retrieval; and is responsive to a signal of a second polarity emanating from each cell to pass through the translation means in the opposite direction thereby to identify each symbol to which the particular memory cell is related.

In further accord with the present invention, the cell designations of a multiplet being stored, or a multiplet used upon inquiry to seek a response, are registered in counting means uniquely related to each storage cell, and capable of distinguishing the full count of a storage multiplet and the full count of a smaller, inquiry multiplet.

In accord further with the invention, the richness of the encoding is increased by providing that each input word shall be of a uniform length. This is accomplished by utilizing an end-of-word symbol (such as "*e*") as a portion of the word, and repeating characters of the word, including the end-of-word symbol, as many times as necessary to reach uniform length; words in excess of the uniform length are truncated automatically. If, for example, the uniform length is nine characters, the word "CAT" becomes a simultaneous combination of the nine symbols C1, A2, T3, *e*4, C5, A6, T7, *e*8, C9.

In still further accord with the present invention, mutually identical symbols in two or more words of a multiplet are handled specially so as not to degrade system performance through guaranteed saturation of certain cells. In accordance with the invention in one form, a symbol in a word which is identical to another symbol in the same multiplet is not encoded into its related cells with its own word, but rather is presented only once, as if it were a complete word, without regard to the number of words in which the identical symbol appears. Such a symbol, for instance, might be the symbol A2 in the triplet comprising CAT, RAN, and DOG, or the symbols A2 and T3 in a triplet comprising CAT, RAN and FAT.

The invention is disclosed in an embodiment capable of receiving more words than are to be found in a multiplet, either on storage or inquiry; the apparatus automatically making up all combinations of multiplets which are implicit in the number of words received. In the embodiment of the invention disclosed herein, multiple symbol responses for a given character position of a response word are recognized and provide part of the total output response.

General system characteristics include parallel processing and consequent high speed, equipotential and redundant memory providing a degree of immunity from certain malfunctions and tolerance to inexact inquiries, and extensive sharing of cells among multiplets enhancing storage economy. In particular, the number of memory cells in the embodiment disclosed herein, used for permanent storage of complex associations among some 600 words, is comparable to the number of bits required merely to store an equivalent number of words in an ordinary, nonassociative manner.

The foregoing and other objects, features and advantages of the present invention will become more apparent in the light of the detailed description of preferred embodiments thereof set forth hereinafter, as illustrated in the accompanying drawing.

BRIEF DESCRIPTION OF THE DRAWINGS

FIG. 3 is a simplified illustration of an encoding tree useful in the apparatus illustrated in FIG. 2;

FIG. 4 is a schematic diagram of an exemplary tree amplifier;

FIG. 5 is a schematic diagram of an exemplary memory amplifier;

FIG. 6 is a simplified schematic block diagram of a logical memory cell of one type which may be used in the present invention;

FIG. 7 is a simplified block diagram of input circuitry for use in the embodiment of the invention illustrated in FIG. 1;

FIG. 8 is a simplified schematic block diagram of control circuitry which may be utilized in the embodiment of the invention illustrated in FIG. 1;

FIG. 9*a* is a diagram illustrating input timing of the embodiment of FIG. 1;

FIG. 9*b* is a diagram illustrating word loading and output timing in the embodiment of FIG. 1.

Figure 15:
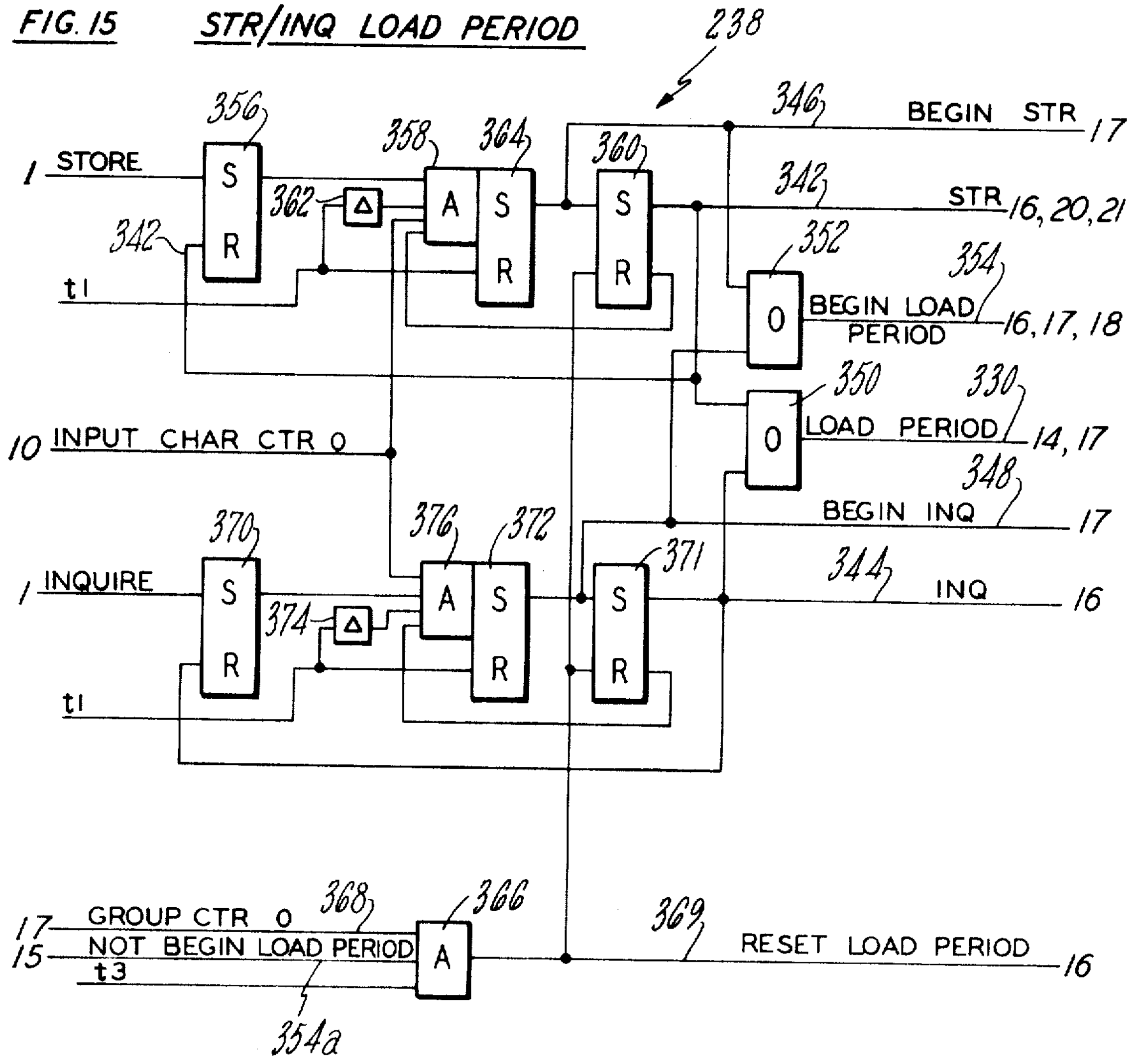
Figure 16:
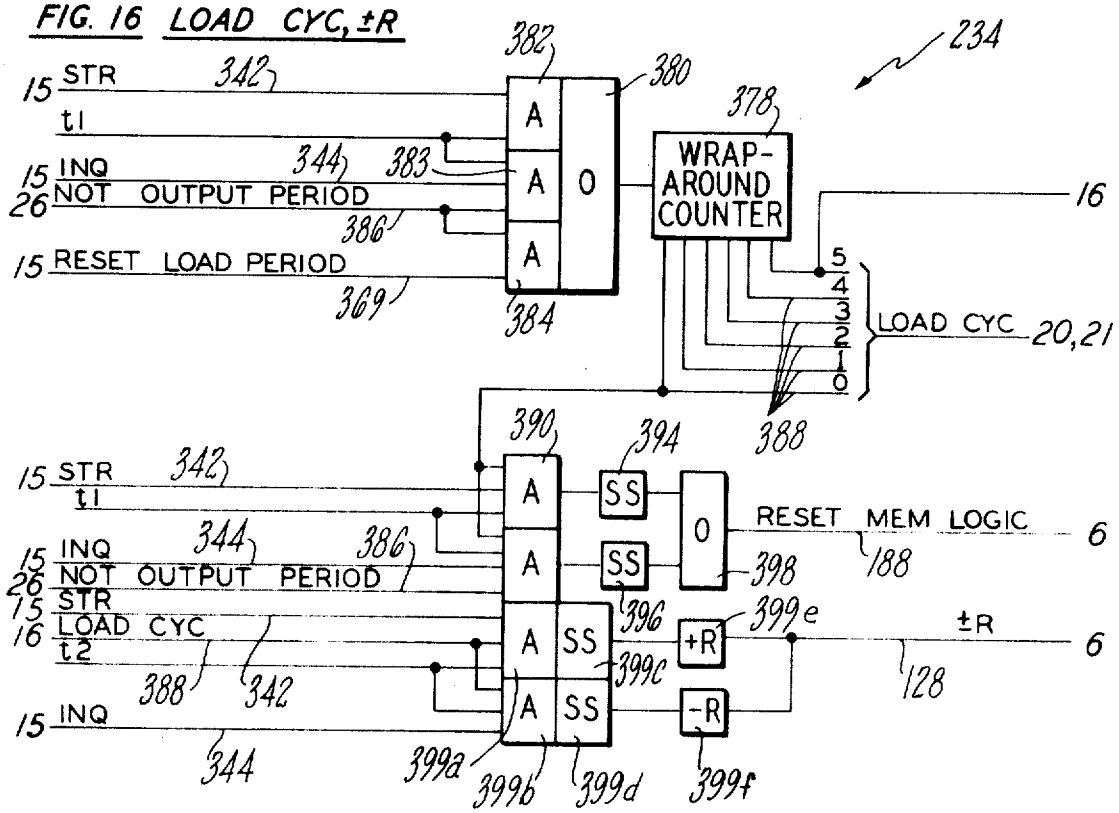
Figure 17:
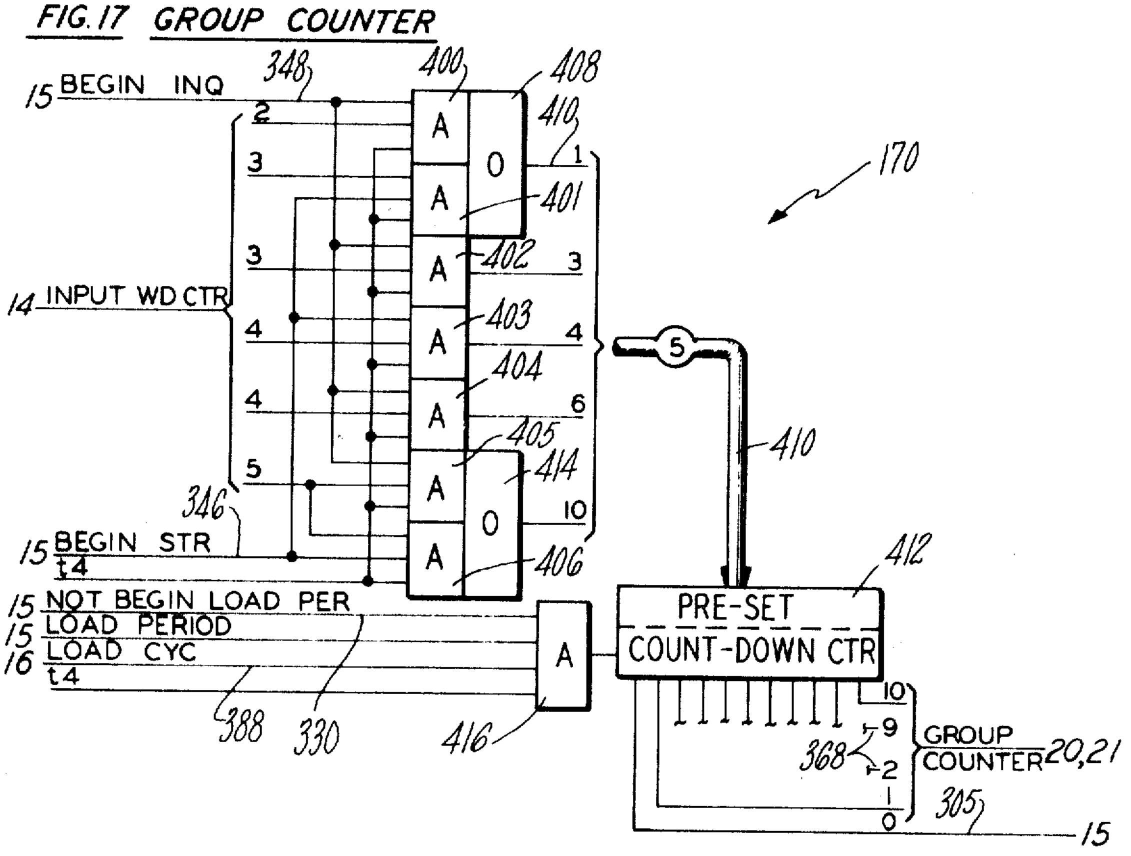
Figure 18:
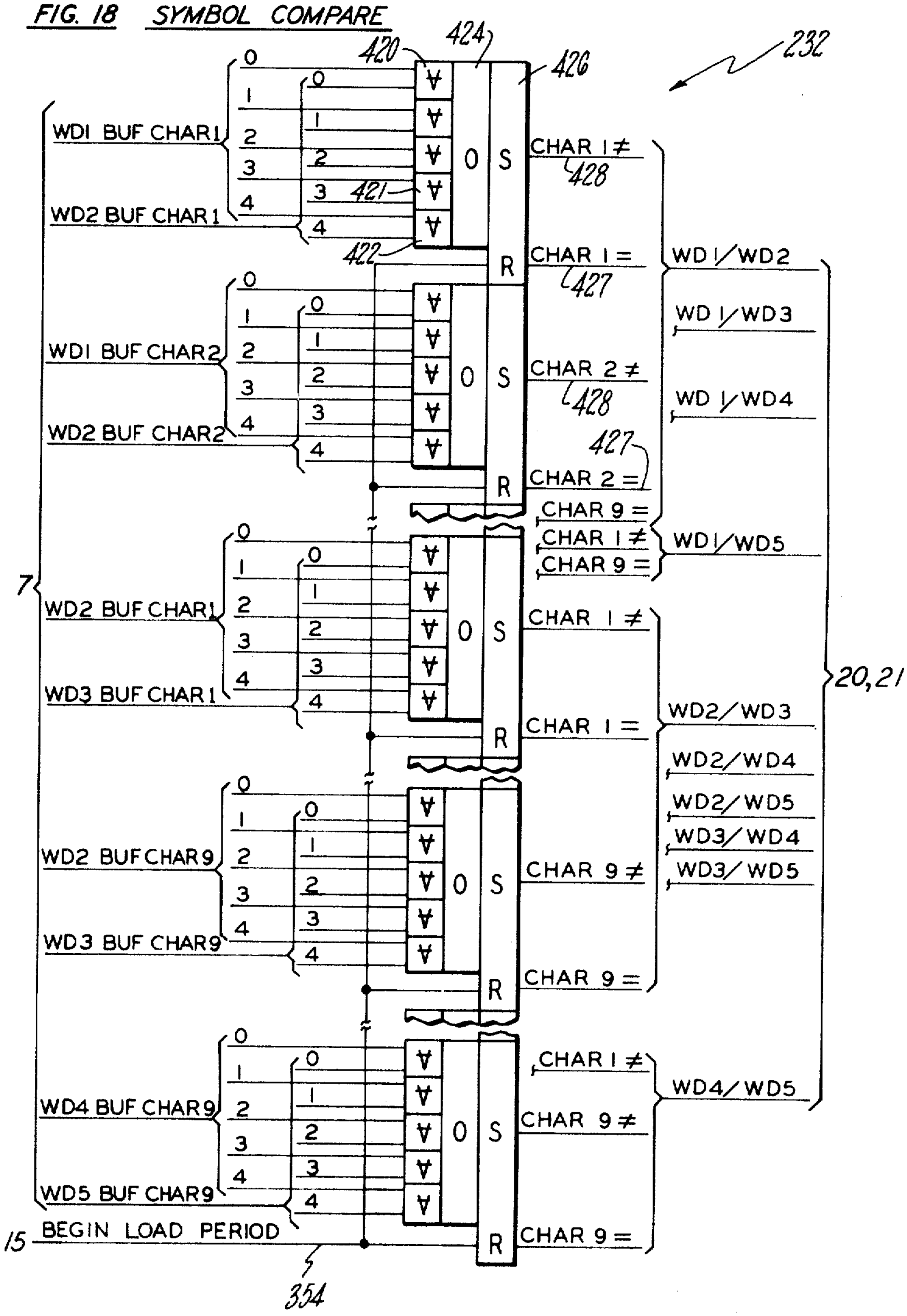
Figure 20:
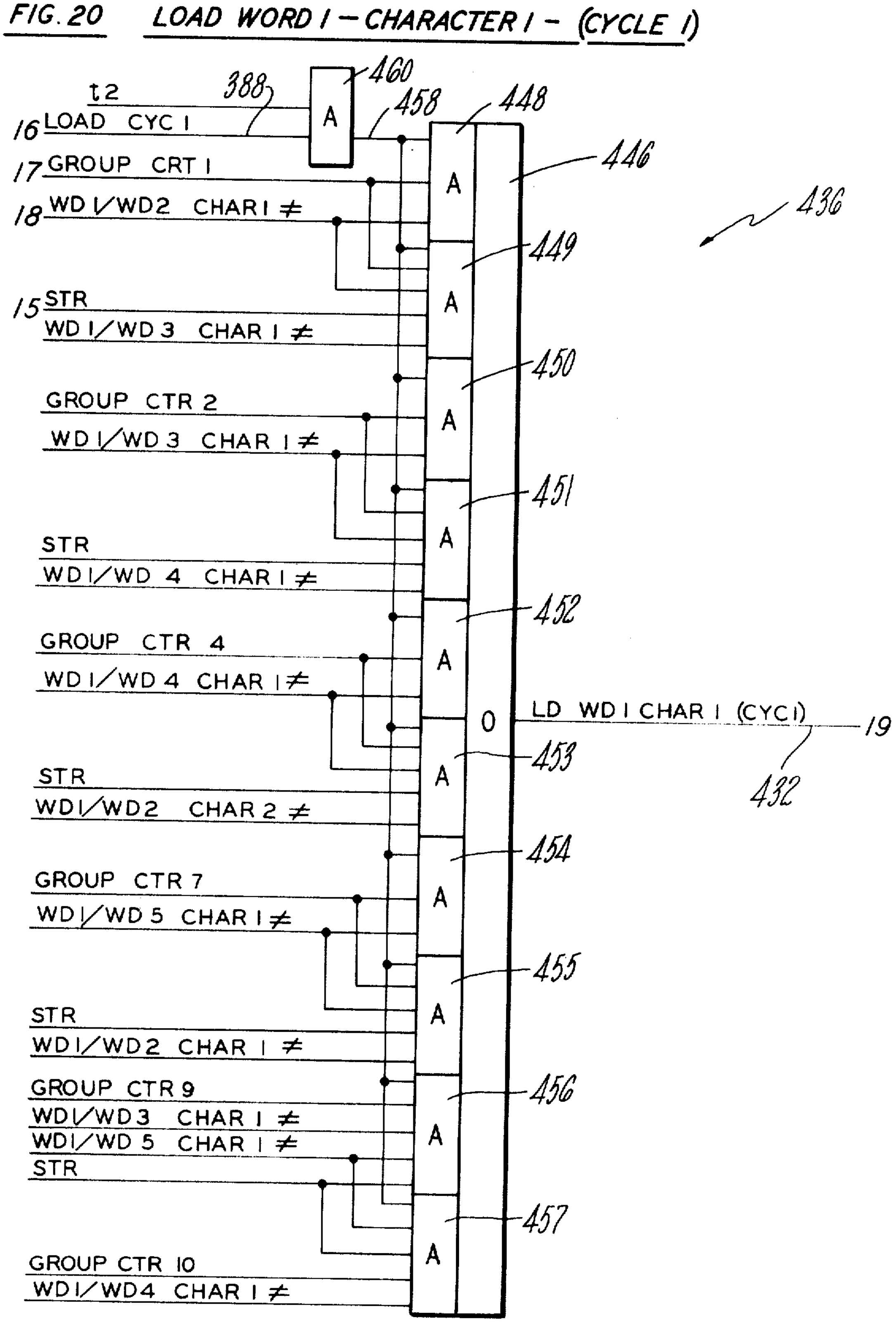
Figure 21:
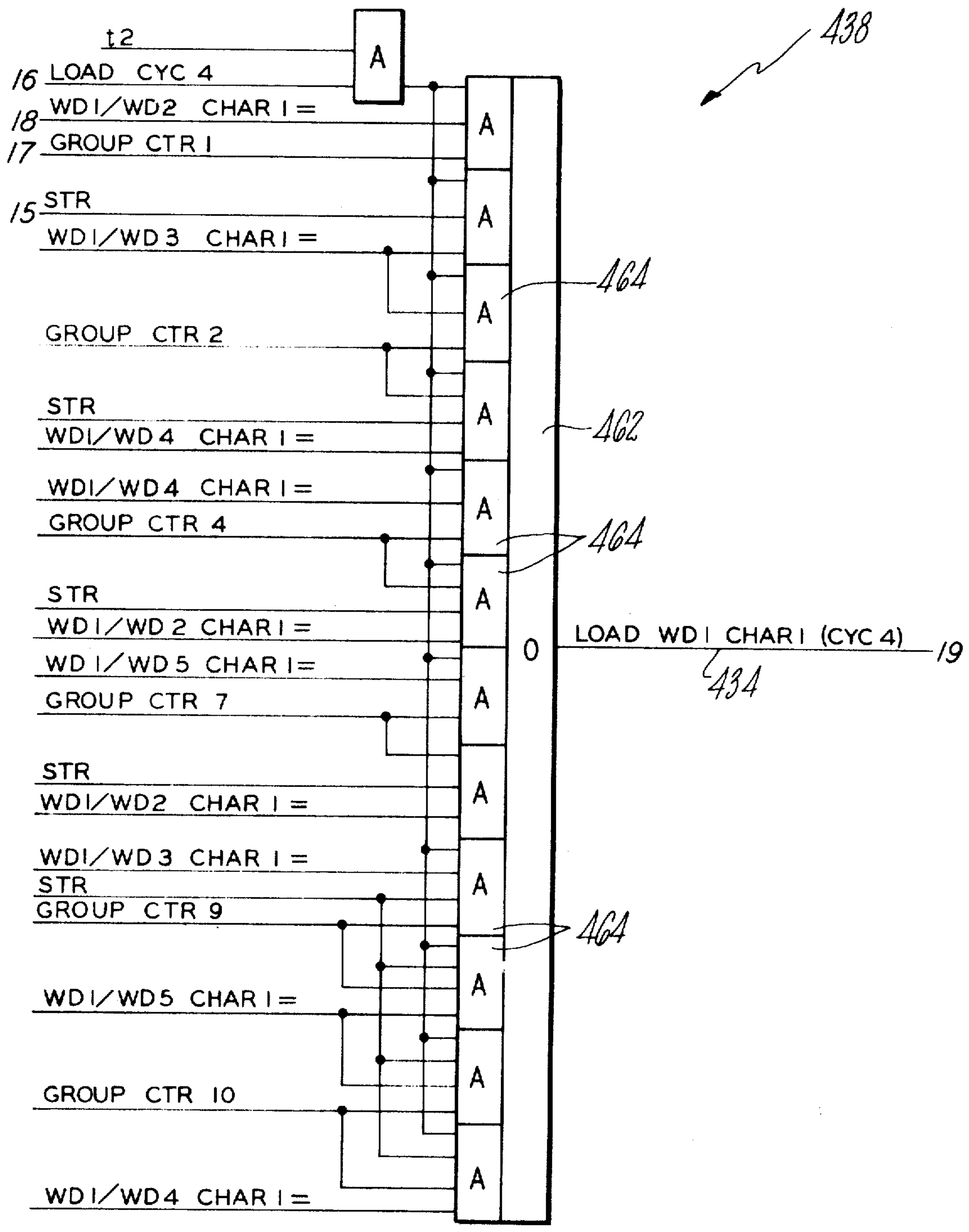
Figure 22:
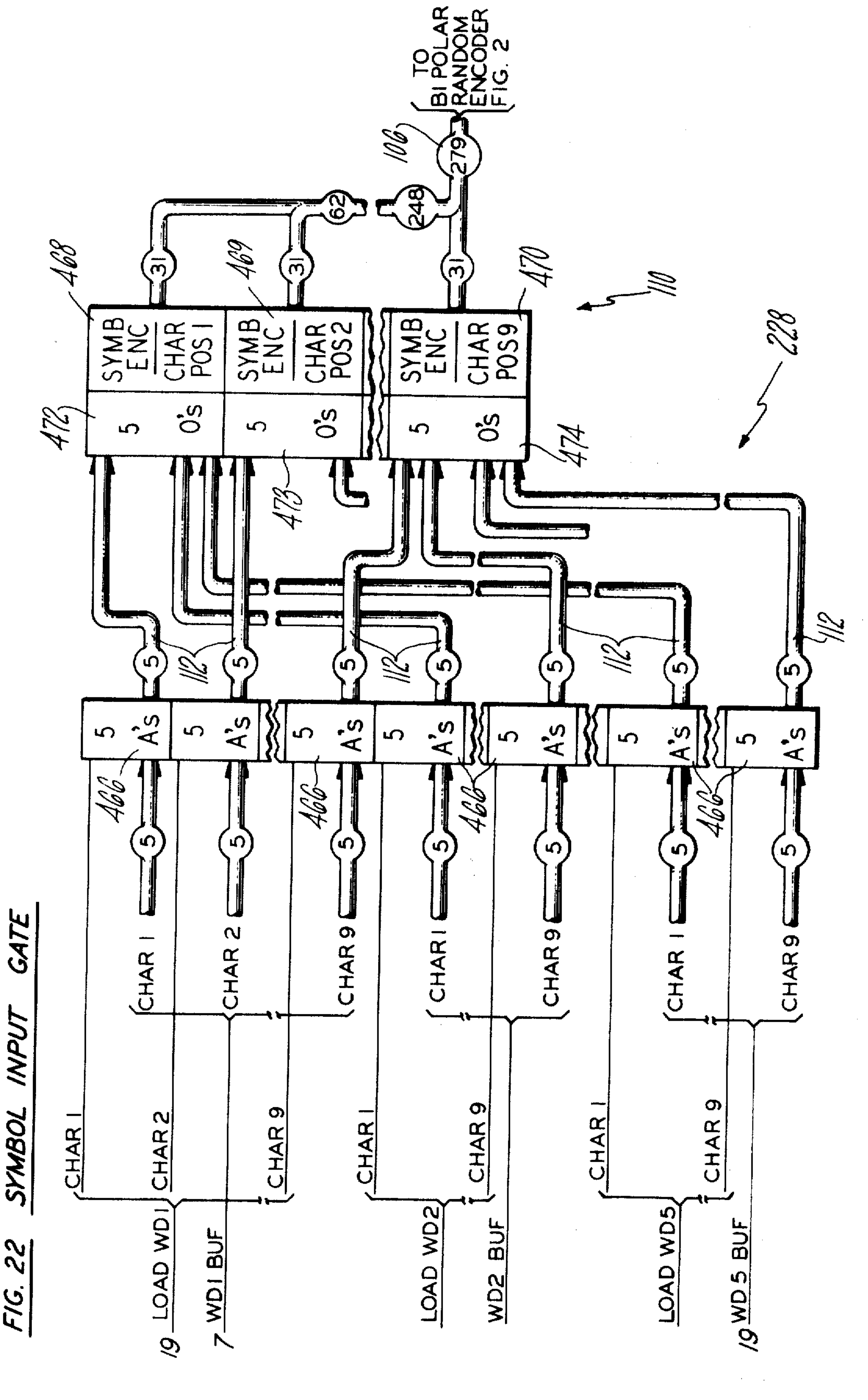
Figure 23:
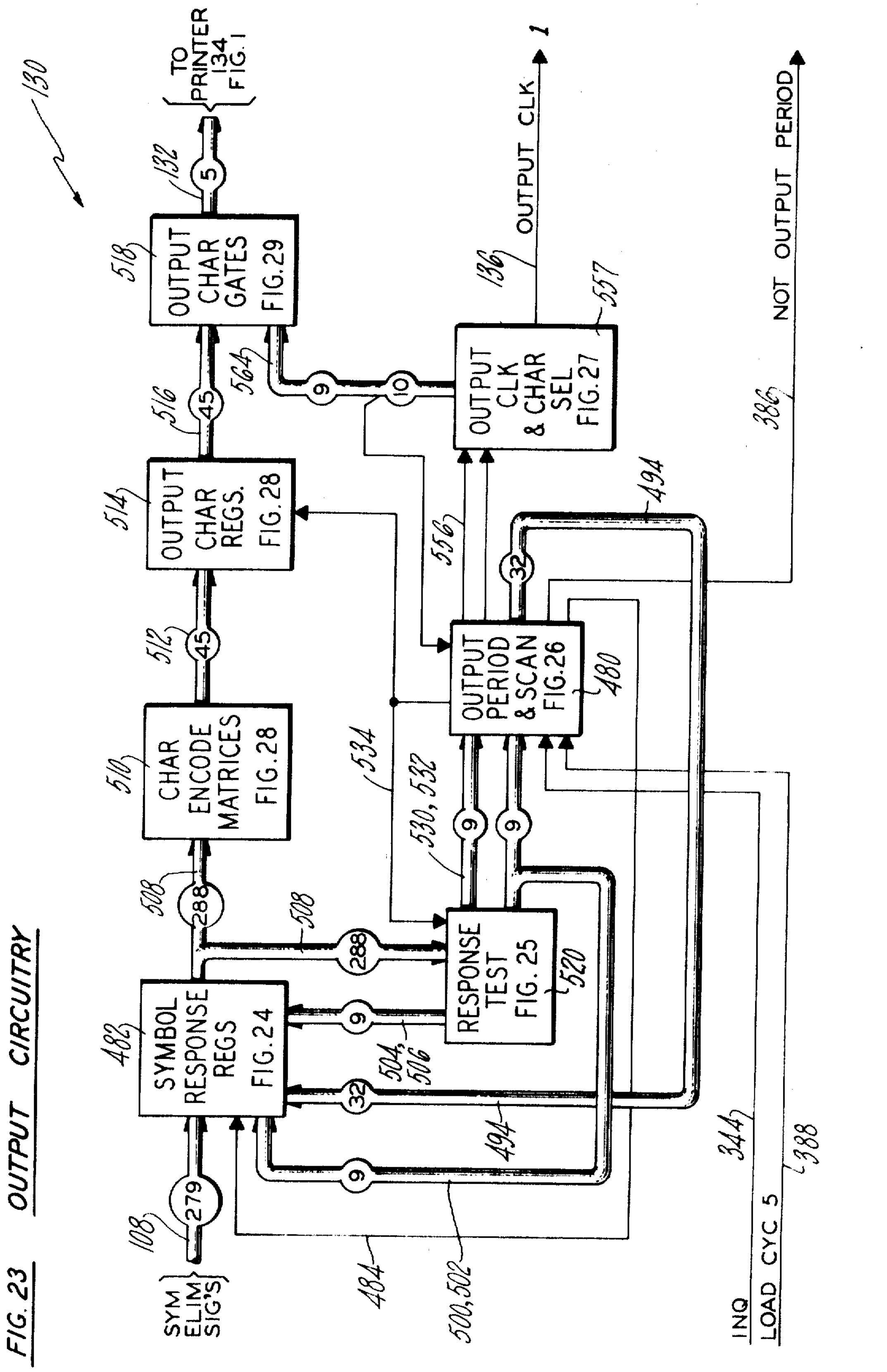

The remaining figures comprise simplified schematic block diagrams of various portions of the apparatus of FIG. 1 as follows:

FIG. 10—Input Character Counter;
FIG. 11—End of Word Detector;
FIG. 12—Fill Control;
FIG. 13—Word Buffer Input Gate;
FIG. 14—Input Word Counter;
FIG. 15—Store/Inquire and Load Period;
FIG. 16—Load Cycle and Plus/Minus R Circuitry;
FIG. 17—Group Counter;
FIG. 18—Symbol Compare Circuit
FIG. 19—Word Load Controls;
FIG. 20—Load Word 1, Character 1 (cycle 1);
FIG. 21—Load Word 1, Character 1 (cycle 4);
FIG. 22—Symbol Input Gate;
FIG. 23—Block Diagram of Output Circuitry;
FIG. 24—Symbol Response Register;
FIG. 25—Response Test Circuitry;
FIG. 26—Output Period and Scan Control;
FIG. 27—Output Clock and Character Select;
FIG. 28—Character Encode and Registers; and
FIG. 29—output Character Gate.

THEORETICAL DISCUSSION

This section is concerned with the elementary theory involved in the practice of the present invention. However, because the concepts of the present invention are fully discussed in the general and detailed sections hereinafter, this section may be passed over if desired.

The associative mechanism of the invention can be described by first defining two classes of entities. Explicit entities ($E_e$) are those deliberately entered as words or other expressions in the input language. These include ordinary English words, technical terms, phrases, data, reference numbers, and proper names. When entered into the system for either storage or inquiry, an explicit entity is automatically broken down into symbolic constituents based on its particular characters. When the system delivers one or more responses to an inquiry, the response words are reconstructed from a set of symbolic constituents.

Implicit entities ($E_i$), though meaningful to the system, are unverbalized. They are automatically formed and stored when groups of associated $E_e$ are supplied to the system. Only the $E_i$ go into long term storage; it is unnecessary to provide long term storage of the $E_e$.

In the present embodiment, the basic association grouping is an unordered set of three $E_e$, or a "triplet." Associated with every such triplet is a distinctive $E_i$. An $E_e$ can be a member of several triplets, and two different triplets can share two (but not three) common $E_e$ members. The triplet convention is chosen because a simple physical system requires a constant number of members per group. The use of two members per group is too unspecific for most associative purposes, while four seems unnecessarily rigid. Nevertheless, the use of triplets as building blocks allows a substantial variety of associative structures to form.

Following storage (or between subsequent storages) it is possible to address the system, or "inquire," with two words. If these are common members of any stored triplet, the system should respond promptly with the third word of the triplet, regardless of the direction from which the triplet is reached (that is, for any of the three possible inquiry pairs). In some cases, the response to a single-triplet inquiry may be very helpful to the user of the system; in other cases, it may seem redundant. In all cases, the response will be meaningful and relevant to both words of the inquiry. Note that inquiries may be concatenated to pursue a line of investigation, representable as a stepwise continuous path from triplet to triplet.

The heart of the system is a large array containing K identical cells. Each cell has provisions for simple logical operations and a capacity of one bit of permanent memory. The cells operate independently of one another. By means of language-dependent encoding (described hereinafter), words can be represented as distinctive patterns of binary cell activity. Encoding is such that each word will have its own invariant pattern. An approximately constant fraction of the cells, $w$, is energized by any single word, independent of input word length. Thus the set of active cells $W=Kw$. (Capital letters are used herein to refer to either the name or the cardinal number of a set.) If patterns of activity could be displayed, they would appear random and reasonably uniform in spatial distribution.

Let $W_1$, $W_2$, $W_3$ represent the three word patterns of a triplet to be stored. The implicit entity linking these words can be modeled as the logical intersection of the three sets, or $E_i=W_1\cap W_2\cap W_3$. If the words are put in sequentially, each cell needs two bits of temporary storage (such as provided by a two-stage counter) to determine whether it is a member of $E_i$. If it is, the cell registers a 1 in its permanent memory; if not, its memory remains at 0. The temporary-storage portions of all cells are then reset to their original states. This has the effect of discarding all of the input except the residual $E_i$. As succeeding triplets are supplied, permanent memory accumulates as the logical union of implicit entities:

$$M=E_{i1}\cup E_{i2}\cup E_{i3}\cup\ldots\cup E_{it}$$

where $t$ is the total number of triplets stored and $M$ is the set of registered memory cells. Note that a cell may be a member of several $E_i$.

Upon inquiry, $W_1$ and $W_2$ (for instance) set up an "inquiry pattern" $Q=W_1\cap W_2$. The correct response $R$ (in this case $R=W_3$) cannot in general be retrieved uniquely, but it can be approximated by a process of cell elimination. The rule can be stated symbolically as $Q\cap\overline{M}\subset\overline{R}$; that is, cells that belong to the inquiry $Q$, but are not members of the total memory pattern $M$, cannot possibly belong to the response $R$. This is obviously so, for any cell that is a member of both $Q$ and $R$ is by definition a member of $W_1\cap W_2\cap W_3$, and hence would have been registered as a member of $M$ during storage. This rule allows the system to eliminate the $Q\cap\overline{M}$ cells from consideration in reconstructing the response. The remaining cells include all those of $W_3$ plus some false cells, but the latter are not particularly troublesome, as is described hereinafter.

Encoding is required to form $W$ patterns from actual expressions in the input/output language. In its present form, the encoding method artificially extends words up to a standard number of characters. This is a convenient way of regulating w, the relative density of word patterns. Extensions is accomplished by appending an end-of-word symbol ($e$) and then repeating the word until a standard length $\gamma$ is reached. The system's alphabet can contain any reasonable number ($\alpha$) of characters; both $\alpha$ and $\gamma$ must be constants. If $\alpha=32$, for example, there is room for 26 letters and some special characters. If all 32 characters are assumed to occur with equal frequency, and if we take $\alpha=9$, there will be a capacity of 45 bits per word ($9\log_2 32$). According to these rules, "CAT" would be input as CAT$e$CAT$e$C.

Character sequence is taken into account by numbering the character positions from 1 to $\gamma$ and combining these numbers with their corresponding characters. Thus, "CAT" becomes a simultaneous combination of nine symbols whose order is unimportant: T7, $e$4, C5, C9, A2, A6, T3 and $e$8.

The system treats all 288 symbols ($\alpha\gamma$) equally and independently. Each symbol is represented as a fixed, random pattern in the cellular array. The 288 patterns can overlap, yet each is distinctive. Since the patterns are fixed, the encoding of each symbol can be wired in as an interconnection tree—there is no need to wait for table lookup or other auxiliary operations. Permanent encoding is feasible because there is no fundamental reason for changing the patterns. The only known conditions for efficient encoding are ($a$) a constant optimal number of cells per symbol, and ($b$) complete independence among patterns. This requirement for strict independence is the main reason for using random connections. (In fact, all attempts to improve encoding by interfering with this independence have failed.)

Let $C$ represent the set of cells energized by a single symbol. Then word patterns result from the union of symbol patterns:

$$W=C_1\cup C_2\cup C_3\cup\ldots\cup C\lambda.$$

We can now calculate w as a function of $\gamma$ and $c$ (where $c$ is the symbol pattern density $C/K$). Define the complementary variables $\bar{w}=1-w$ and $\bar{c}=1-c$. Assuming orthogonality, $\bar{w}$ will be approximately equal to the $\gamma$ power of $\bar{c}$. For $c=0.018$ and $\gamma=9$, $w$ is about 0.15. The parameter $c$ directly affects the relative densities of words, triplets, and total memory. All of these variables interact to produce a certain overall system efficiency.

Upon inquiry, the criterion $Q\cap\overline{M}\subset\overline{R}$ is applied in testing every language symbol. For example, if the symbol S6 includes, in its set C, one or more cells that are in $Q\cap\overline{M}$, the symbol can be eliminated as a possible candidate for the sixth place in the response word. However, if the symbol A6 happens to be one of the correct symbols, it will always pass this test. Thus the correct response R will always emerge, though it may be accompanied by a number of extra characters, depending on system efficiency. In general, larger values of $C$ (up to a point) can present more opportunities to test a given symbol and can thereby suppress false symbols more efficiently.

The present embodiment is a parallel-organized machine in which the "program" is almost completely wired in. There is a console containing an electric printer/keyboard or typewriter used for both input and output, with provisions for initiating storage and inquiry. The embodiment provides series/parallel parallel conversion of inputs and outputs, buffer storage of words and symbols, and functional control.

The encoder consists of a "forest" of $\alpha\gamma$ independent trees, one for each symbol, terminating in a large interconnection matrix for random attachment to the memory array. Each tree contains several levels of fan-out, with a branch circuit at each branching node. Bidirectional operation is effected on the basis of pulse polarity in the branching circuits. Each branch circuit is designed (*a*) to amplify and distribute pulses of one polarity to its branches in one direction, and (*b*) to act as an OR gate in the opposite direction for pulses of the opposite polarity.

The memory array consists of K identical circuits, each containing a two-stage counter, some simple logic, and a memory device such as a flip-flop or latch. Each memory circuit has a single bidirectional connection to the encoder. Other connections are common to all memory circuits.

Note that the mechanization of encoding permits all symbols to be tested simultaneously upon inquiry. Consider a single cell in the array. If it is not a member of $Q \cap \overline{M}$ at the time of inquiry, it remains quiescent. If it is a member of $Q \cap \overline{M}$, it sends out a "fail" pulse regardless of its membership in one symbol pattern or another. The fail pulse will flow back through the encoding trees and validly eliminate any symbol to which it is connected as a candidate for the response word.

Only those symbols that have not thus failed become candidates for response. If system parameters are chosen properly, there will be only one such symbol most of the time at each of the $\gamma$ character positions.

DESCRIPTION OF THE PREFERRED EMBODIMENT

Figure 1:
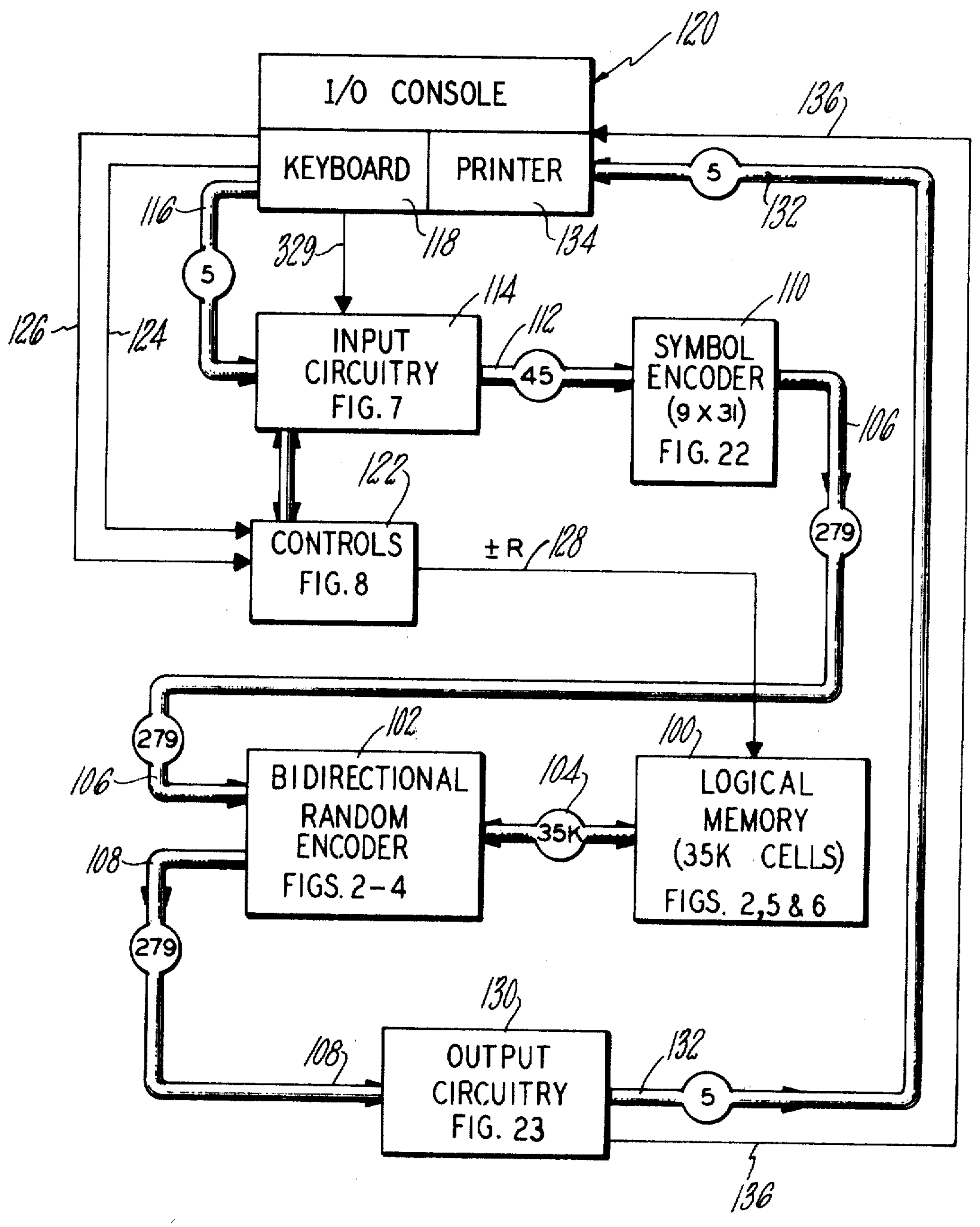
FIG. 1 is a simplified block diagram of apparatus in accordance with the present invention.

Referring now to FIG. 1, an embodiment of the present invention includes a logical memory 100 having, in the embodiment herein, an array of 34,875 memory cells, each capable of performing simple logical operations, as is described more fully in detail with respect to FIG. 6 hereinafter. The logical memory 100 is connected on a cell-to-cell basis to a like number of outputs from a bidirectional random encoder 102 by a trunk of 34,875 lines 104. The bidirectional random encoder 102 in turn may be responsive to a trunk of 279 input lines 106 or may instead provide responses on a trunk of 279 output lines 108. Each of the 279 lines in each the trunk of lines 106 or the trunk of lines 108 corresponds to a symbol, which is defined herein as being a unitary designation for a character as well as the position within the word in which the character is situated. For instance, the first three symbols in the word "CAT" are C1, A2 and T3. In the present embodiment, each word is nine characters long (thereby having nine character positions) and there are 32 possible characters which may appear in any of the nine positions. One of the 32 characters (the apostrophe) does not encode and cannot energize or affect memory. It is reserved to allow a space in a word which will be a nullity insofar as memory is concerned. This allows the operator to insert special words to resolve response ambiguities, as is described more fully hereinafter. It also is used by the system to tell the operator that no response came from memory for a given character position. Thus 31 characters may be encoded for storage or inquiry, giving rise to a total of 279 possible symbols for each word. Each of the 279 lines 106 is connected to a related output of a symbol encoder 110 which in turn responds to 45 input lines 112: nine character positions of five-binary bits each are encodable by the 45 lines 112. The lines 112 are energized by input circuitry 114 which is described in more detail with respect to FIG. 7 hereinafter. The input circuitry will present three successive sets of binary encoded signals on the lines 112 representing three successive words of a triplet during a store operation, and will present two successive sets of binary encoded signals representing a pair of words in an inquire operation. The input circuitry 114 receives the words one character at a time over a trunk of five lines 116 from a keyboard 118 of an I/O console 120. Control circuitry 122 receives a store signal on a line 124, and an inquire signal on a line 126. The control circuitry 122 supplies either a positive or a negative signal on a ± R line 128 to the logical memory 100. As described more fully hereinafter, a positive signal on the line 128 causes the registering of the randomly encoded bits that intersect during the storage of a triplet, whereas a negative signal on the line 128 causes a response to a two-word inquiry. When an inquire operation is being made, at least two words are entered via the keyboard 118 into the input circuitry 114, following which an "inquire" key is depressed causing a signal on a line 126. This will cause two words to be successively passed through the symbol encoder 110 and the bipolar random encoder 102 into logical memory 100, following which a negative signal will appear on the line 128 causing response signals in the logical memory 100 to pass back over the lines 104 through the bipolar random encoder 102 and over the lines 108 to output circuitry 130 wherein certain editing operations are performed, thus to provide a series of characters in binary code on a trunk of five lines 132 to a printer section 134 of the I/O console 120 which also receives output clock signals over a line 136 from the output circuitry 130. The control circuitry 122 is interrelated with most of the system.

Figure 2:
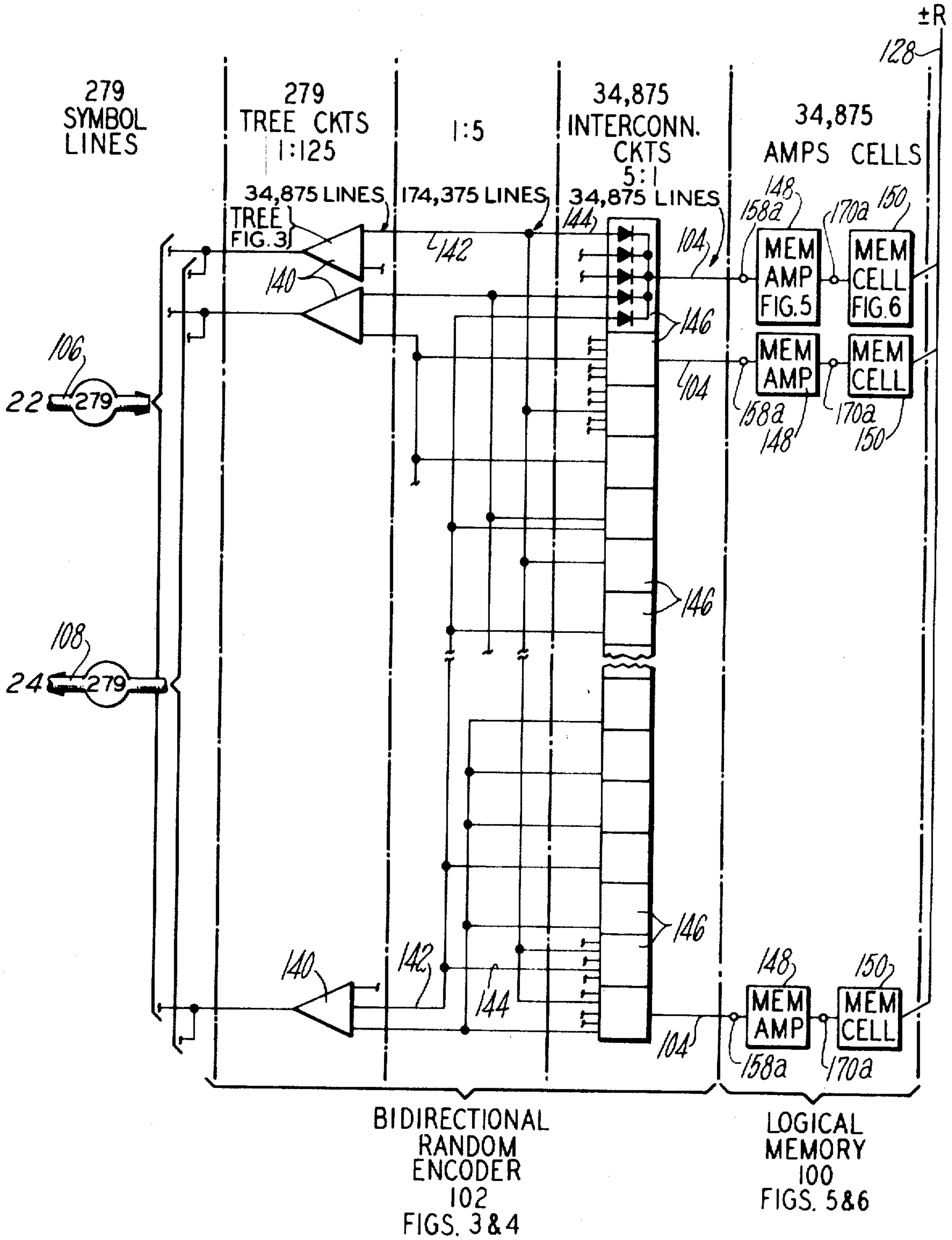
FIG. 2 is a simplified schematic diagram of the encoding and memory apparatus of the preferred embodiment of the invention illustrated in FIG. 1.

Referring now to FIG. 2, each of the 279 symbol lines 106, 108 is connected to the single-input end of a related tree circuit 140 which provides a fan of 1:125, thereby to interconnect each of the symbol lines with 125 lines 142. Thus, all of the 279 tree circuits together provide 34,875 output lines. Each output line 142 of each tree circuit is in turn fanned into five lines by interconnection circuitry 144, thus to provide a total of 174,375 lines at the inputs to 34,875 interconnection circuits 146 which provide a 5 to 1 line reduction. The output of each of the 34,875 interconnection circuits 146 is connected to a related memory amplifier 148, the output of which is connected to a corresponding memory cell 150. For each word transferred to the logical memory 100, nine lines out of the 279 lines 106 will be energized, thereby energizing nine trees 140. This will cause 1,125 lines 142 to be energized which in turn will cause 5,625 of the lines 144 to be energized. Due to random interconnection, something less than 5,625 of the interconnect circuits 146 will be operated and something less than 5,625 of the memory cells 150 (approximately 5,238) will in turn receive a signal. Thus, for any symbol (such as C1, A2, T3 etc.) the bidirectional random encoder 102 will activate 625 memory cells 150 (in the present embodiment), the particular cells which are activated being the same for that symbol whenever the one of the lines 106 relating to that symbol is energized, the pattern of memory cells 150 which respond to that symbol being random in nature and spatially distributed over the array occupied by the 34,875 memory cells 150.

Each of the 279 lines 108 is also connected to the single-input end of one of the tree circuits 140. During an inquire operation, each memory cell 150 which cannot be part of the proper response will generate a cell fail signal, of a negative polarity that is propagated (from right to left in FIG. 2) through the memory amplifiers 148 and to the interconnect circuits 146 which, in this case, fan the fail signals outwardly to the 174,375 lines 144 which, due to the interconnection of these lines to single lines 142 will result in one signal at the right-hand input of each of five tree circuits 140, thereby causing symbol fail signals of a negative polarity to appear on five of the 279 output lines 108. It should be noted that, due to the random, redundant nature of storage, the likelihood is that a large number of memory cells 150 will supply cell fail signals so that far more than five of the 279 output lines 108 will have fail signals thereon as a result of each inquiry operation. This aspect of the present invention is described more fully hereinafter.

The tree circuits 140 are illustrated in more detail in FIG. 3. Therein, each tree circuit 140 is seen to contain three layers of tree amplifiers 152 arranged so as to cause a fan-out (from left to right as viewed in FIG. 3) of 1 to 125 as an input to logical memory; conversely, each tree circuit 140 provides a fan-in (from right to left as viewed in FIG. 3) of 125 to 1 in the output direction. Each of the tree circuits 140 comprises thirty one tree amplifiers 152, the first and second layers having the output of each amplifier connected to the inputs of five amplifiers in the next layer.

Each of the tree amplifiers 152 is of the form illustrated in FIG. 4, and includes an input amplifier 154 and an output amplifier 156. This provides powering of positive signals in the input direction so that each amplifier may drive five amplifiers in turn (or the inputs to five interconnection circuits 144, FIG. 2), while providing fan-in OR circuit capability of negative signals in the output direction (from right to left as seen in FIG. 4). Consider first a positive signal applied at an input terminal 158; this is passed through a diode 160 and to a transistor 162 which amplifies and inverts the signal and passes it to a transistor 164 which further amplifies and inverts the signal, thus providing a positive output on a line 166. The output is passed through a diode 168 to the output terminal 170 of the tree amp 152. On the other hand, a negative signal received at the terminal 170 is coupled through the diode 168 and amplified by transistors 172, 174 and passed over a line 176 to the diode 160 which couples it to the output 158. The diode 160 provides isolation for the negative output signals thereby permitting five of the terminals 158 to be interconnected together as illustrated in FIG. 3. The amplifier 154 is biased so as to be insensitive to negative signals on line 161 and the amplifier 156 is biased so it will be insensitive to positive signals on line 171.

The memory amplifiers 148, shown generally in FIG. 2 and illustrated in detail in FIG. 5, each include an input amplifier 154 and an output amplifier 156 identical to the amplifiers 154, 156 of the tree amplifiers 152 illustrated in detail in FIG. 4. The distinction between the memory amplifiers 148 and the tree amplifiers 152 is that the circuit providing for OR circuit operation at the input relates to the positive signals propagating toward memory in the memory amplifier 148 (whereas it relates to the negative signals propagating away from the logical memory in the tree amplifier 152). Specifically, in FIG. 5, a resistor 180 is connected to a negative supply at the input 158*a* in contrast with the resistor 169 connected to a positive supply at the input 170 in the tree amplifier 152. Similarly, the input 170*a* in the memory amplifier 148 is not provided with a connection to an operating potential, in a fashion similar to the input 158 in the tree amplifier 152.

The purpose of the bidirectional amplifiers is to permit having but a single hard-wired encoder arrangement and thus to obviate the design of a separate decoding apparatus with identical connections. Although there may be a failure in the circuitry illustrated in FIGS. 2–4, the interconnection of the lines 142, 144 and the particular connections of the lines 142 to the tree circuits 140 are guaranteed to be the same for positive signals propagating toward logical memory as for negative signals propagating from logical memory. However, although this is one feature of a particular aspect of the present invention, it should be understood that it represents merely the preferred embodiment, and that the invention does not require the same interconnections for signals propagating toward memory as for signals propagating from memory; for instance, the problem of the possibility of different interconnects can be accommodated by use of automated manufacturing technology (such as photoresist) wherein an input random encoder is guaranteed to have the same relationship as an output random decoder.

Each of the memory cells 150 shown generally in FIG. 2 is illustrated in detail in FIG. 6. Therein, the permanent memory element comprises a suitable bistable binary device such as a flip flop or latch 180 which is settable by an AND-circuit 182 in response to each of three inputs being positive. One of the inputs comprises a plus R signal on the line 128, and the other two inputs comprise signals on a pair of lines 184, 185 which are respectively connected to the lowest and highest ordered bit outputs of a two bit binary counter 186. The binary counter 186 is reset by a RESET MEM LOGIC signal on a line 188; this signal, generated in FIG. 16 as described hereinafter, indicates the start of the load cycles within which two words of an inquiry or three words of a store operation may be loaded through the random encoder 102 into logical memory 100. The signal on line 188 appears just at the start of a first load cycle; then, the first word of a pair or triplet is gated out of the word buffer storage in the input circuitry 114 (FIG. 1) through the symbol encoder 110, the bidirectional random encoder 102, and to logical memory 100. Thus, a positive signal may appear on a RANDOM BIT LINE 189 in the event that the particular word being loaded includes a symbol wired to the particular bit line 189. Similarly, signals may appear on the same random bit line 189 as a result of the second word of an inquire pair or the second and third words of a store triplet; or they may not, in dependence upon whether or not the words loaded include symbols which encode to that particular cell of logical memory, as described hereinbefore. When the two bit binary counter 186 is reset by the signal on line 188, its output reflects binary zero-zero (decimal zero). If one bit is received, the output reflects binary zero-one (decimal one); if a second bit appears, the counter is advanced to binary one-zero (decimal two); and if a third bit is received the two-bit binary counter 186 is set to binary one-one (decimal three). In the event that the two-bit binary counter reflects a three in a store operation, both of the lines 184, 185 will be positive; then, a plus R signal is received on the line 128 thereby causing the AND-circuit 182 to set the latch 180 (provided the latch had not previously been set by the storage of a different triplet which happens to include that particular memory cell, in which case the latch remains set).

On the other hand, during an inquire operation, the RESET MEM LOGIC signal on line 188 will reset the two-bit binary counter 186 at the start of word loading, and if thereafter two positive signals are received on the random bit line 189, indicating that both of the inquiry pair of words include a symbol having the particular logical memory cell in the distribution of bits for the inquiry pair, then the binary counter 186 will be set to binary one-zero (decimal two), and thus provide a negative signal on a line 190. If the logical memory cell has not been set, then the latch 180 will be in the reset state and there will also be a negative signal on the line 192. These two signals are applied to an AND-circuit 194 which responds to three negative inputs to provide a negative output on the random bit line 189. Thus, if the binary counter 186 is set to two on an inquire operation, and the memory cell latch 180 has not been set, then the appearance of the minus R signal on the line 128 causes the AND-circuit 194 to provide a negative cell fail signal on line 189 to the random bit line 189. All of memory may be cleared at once by signals on lines such as the line 191, if desired.

The negative cell fail signal on the random bit line 189 will be amplified by the memory amplifiers 148 (FIGS. 2 and 5) and distributed by the interconnection circuits 146 (FIG. 2) to related ones of the tree circuits 140 (FIGS. 2 and 3) and onto the lines 106, 108 (FIGS. 1 and 2). The negative symbol fail signals on lines 108 will have no effect on the lines 106 since, even though they could pass backwardly through the symbol encoder 110 (FIG. 1) and onto the lines 112, they will have no effect at the outputs of the word buffer registers in the input circuitry 114. However, the signals on the lines 108 will be passed to the output circuitry 130 so as to generate word responses to be sent, in binary code, over the lines 132 to the printer 134 of the input/output console 120.

INPUT CIRCUITRY 114—FIG. 7

The details of the input circuitry 114 are illustrated in block form in FIG. 7. The data flow from the keyboard 119 provides one five-bit binary character at a time over the trunk of five lines 116 to a word buffer input gate 200. Data then passes over a trunk of five lines 202 and through a character distributor 204 where it is selectively caused to pass into a given character channel on a trunk 206 of nine character channels of five lines each so as to be available at the proper character position of a fill register 208 and each of five word buffer registers 210–214. Thereafter, if less than a complete nine character word was entered into a selected word buffer, successive characters are shifted from the fill register 208 through a trunk of 35 lines 216 through the word buffer input gate 200 and the character distributor 204 so as to completely fill the buffer register with nine five-bit binary characters. As each character of data is passed through the word buffer input gate 200, it is also impressed on an input character counter 218 and an end of word detector 220. The end of word detector senses the symbol "*e*" which denotes the end of the input word; typically, this may be automatically encoded as a result of a carriage return in the I/O console 120 (FIG. 1). The input character counter 218 counts the number of characters of actual input data on the bus 116 until the end of the word is sensed, and thereafter counts the number of clock cycles in which character filling is accomplished until a full word of nine characters has been stored in the related one of the word buffers 210–214. The input character counter controls the character distributor 204 so as to cause the data from the word buffer input gate 200 to be correctly applied to the correct five-bit channel of the nine channel trunk of 45 lines 206. Thus, the input character counter 218 causes input data to be successively applied to higher ordered character positions of the fill register 208 and the word buffers 210–214 and similarly causes correct fill characters from the fill register 208 to be properly channeled into higher ordered character positions in both the fill register 208 and the word buffers 210–214. The input character counter 218 also controls a fill control circuit 222 which governs the word buffer input gate 200 and causes it to select the data on the trunk of five lines 116 until the end of word is detected, and thereafter selects correct character positions of the fill register 208 for application by the character distributor 204 to proper character positions of the fill register 208 and the word buffers 210–214. When the loading of one of the word buffers 210–214 is complete, the input character counter stands at a count of nine. It then advances to a count of 10 and causes an input word counter 224 to advance by one count. The input word counter 224 is caused to assume a count of one at the start of input character counting, so that the output thereof, applied by a trunk of five lines 226 controls setting of input and fill characters into the word buffers 210–214. When the input word counter is set to the count of one, data is loaded into the word one buffer 210. Similarly, when the input word counter is set to a count of five, data is loaded into the word five buffer 214. None of the five lines 226 are applied to gate the fill register 208, it is receptive during the loading of any of five input words, so that it may operate as the fill register for each successive character which is loaded.

A symbol input gate 228 is significant in that it performs a number of functions, in response to a word load control 230 and a symbol comparison circuit 232. A prime consideration in the operation of the present invention is the effect which identical symbols within a given triplet can have on the random, associative nature of the operation. For instance, were it not for the function of the symbol comparison circuit 232 (and related circuitry), if two symbols were exactly alike (meaning that two of the input words have the same character such as A, B, C in the same character position such as the first, second or third position) then it is known that each of the logical memory cells which relate to that particular symbol (a given character in a given character position) would definitely have two counts. Similarly, if all three of the words have the same symbol, then each of the cells of that symbol would have three counts. This would degrade system operation since all of these cells would be set, regardless of whether counts are received at these cells as a result of other symbols in the triplet. Since the present invention relies upon the random selection of a limited number of cells in the intersection of the input words, the associative capability of the logical storage would be adversely affected by such a saturation condition.

For instance, consider the following:

TABLE 1

| | |
|---|---|
| WD 1 BUF | HOG*e*HOG*e*H |
| WD 2 BUF | DOCTOR*e*DO |
| WD 3 BUF | VETERINAR |

These three words have one repetitive symbol amongst two of the words: 02, meaning the letter "0" in the second character position. There is no second repetition, even though one of the words is only three letters long, because the second time the 0 appears in the first word, an R appears in the second word. In order to avoid guaranteeing a count of two in each memory cell related to the symbol 02, the present embodiment of the invention will store the three words in sequence, eliminating 02 from the first two words, and then store a fourth word which comprises only 02. Thereafter, all of the logical memory cells having a count of three are "set" by the plus R store signal (on line 128, FIG. 1). Cyclically, this appears as follows

TABLE 2

| | |
|---|---|
| CYC 1 | H G*e*HOG*e*H |
| CYC 2 | D CTOR*e*DO |
| CYC 3 | VETERINAR |
| CYC 4 | O |
| CYC 5 | (+R Store Sig) |

A second example can be three completely distinct words which however have the same word length. When they are expanded so as to be nine characters long, the end-of-word character ("*e*" becomes a "like symbol" since it is the same character in the same character position of each of the three words as follows:

TABLE 3

| | |
|---|---|
| WD 1 BUF | CAT*e*CAT*e*C |
| WD 2 BUF | LOG*e*LOG*e*L |
| WD 3 BUF | FUR*e*FUR*e*F |

Thus, every logical memory cell which can be designated through the random encoder by "*e*4" and every memory cell which can be designated by "*e*7" would otherwise be set, just as a result of these symbols alone, without any contribution from other symbols of the words. The present embodiment handles such a situation as follows:

TABLE 4

| | |
|---|---|
| CYC 1 | CAT CAT C |
| CYC 2 | LOG LOG L |
| CYC 3 | FUR FUR F |
| CYC 4 | *e* *e* |
| CYC 5 | (+R STORE SIG) |

The five different cycles are designated by a load cycle circuit 234 (FIG. 8). The cycles, together with the indication of which symbols (characters in a given character position) are identical (determined by the symbol compare circuit 232), are used to actuate the symbol input gate 128 in such a fashion as to achieve the type of operation indicated in tables 2 and 4.

An additional consideration is that the present embodiment permits the entry of up to five words, with the apparatus automatically making successive pairs for an inquire operation or successive triplets for a store operation. Depending upon how many words are entered (2–5) and the type of operation (store or inquire), various combinations of words are automatically gated by the symbol input gate 228, as illustrated in the following table, wherein the INQUIRE PAIRS and STORE TRIPLETS are indicated in terms of possible combinations of word 1 through word 5. Table 5 indicates that if two words are provided, there is only one group of words, a pair, to be passed through to the logical storage 100 on an inquire operation and it is impossible to store a triplet. If three words are provided, then one group may be stored, which is but a single triplet, or three groups may be loaded, each of which comprises an inquiry pair. If four input words are provided, six different pairs may be loaded for six separate inquire operations or four triplets may be separately stored. If there are five input words provided in total, then 10 different pairs of words may be used for inquiry or 10 separate triplets may be stored.

TABLE 5

| Total Inquire words | Inquire pairs | Group CTR | Store Triplets | Total store words |
|---|---|---|---|---|
| 2 | 1 2 - | 1 | 1 2 3 | 3 |
| | 1 - 3 | 2 | 1 4 3 | |
| 3 | - 2 3 | 3 | 4 2 3 | |
| | 1 - 4 | 4 | 1 2 4 | 4 |
| | - 2 4 | 5 | 5 2 4 | |
| 4 | - 4 3 | 6 | 5 4 3 | |
| | 1 - 5 | 7 | 1 2 5 | |
| | 5 2 - | 8 | 5 2 3 | |
| | - 5 3 | 9 | 1 5 3 | |
| 5 | - 5 4 | 10 | 1 5 4 | 5 |
| WD load→ cycles | 1 2 3 4 5 (4 ↙ LOAD DUPL SYMBS; 5 ↓ −R MEM INQUIRY) | | 1 2 3 4 5 (4 ↙ LOAD DUPL SYMBS; 5 ↓ +R MEM STORE) | |

CONTROLS 122: FIG. 8

For each pair or triplet, that is each "group", there is a corresponding setting of a group counter 236 (FIG. 8). The group counter is preset by the input word counter 224 (FIG. 7) to the highest number indicating the number of groups of words in accordance with Table 5. For each setting of the group counter, a load cycle counter 234 will provide five cycles so as to cause the type of operation indicated in Tables 2 and 4 with respect to the particular pair of triplet related (as in Table 5) to that setting of the group counter. Both the group counter 236 and load cycle counter 234 operate through the word load control 230. The group counter in turn is preset in accordance with the total number of input words sensed by the input word counter 224. These circuits are described in detail, infra.

The load cycle counter 234 and group counter 236, and other circuits herein, are controlled in part by store/inquire controls 238, as described in detail with respect to FIGS. 15–17, hereinafter.

INPUT CIRCUITRY DETAILS: FIGS. 9–14

The input timing is illustrated in FIG. 9 and reference thereto in conjunction with the detailed description of FIGS. 10–14, is recommended. Referring now to FIGS. 9, 10 and 11, the input character counter 218 responds to input data on the bus 116 to generate one data synchronizing signal (DATA SYNCH) on a line 240 for each character of data received over the bus 116. A count of the data synchronizing signals on the line 240 reflects the number of characters actually received. Thereafter, counts of successive cycles during which filling of each word with repetitive characters is accomplished provides a total character count to determine when the currently filling one of the word buffers 210–214 (FIG. 7) is completely full. In FIG. 10, an OR-circuit 242 responds to any of the possible five binary data signals (0–4) on the bus 116 to cause an AND-circuit 244 to set a latch or other bistable device 246 at time *t1* provided a second latch 248 is reset. When the latch 246 becomes set, it will cause an AND-circuit 250 to set the latch 248 on the following time *t3*, thus causing a loss of the reset signal from the latch 248 and thereby preventing the AND-circuit 244 from operating until the latch 248 is again reset. Once the latch 248 becomes set, then the latch 246 is reset on the following time *t1* by an AND-circuit 252, and the resetting of the latch 246 permits, in turn, an AND-circuit 254 to reset the latch 248 on the following time *t3*, provided a signal is present from an inverter 216 indicating that there no longer are any data signals on the input bus 106 as detected by the OR-circuit 242. As illustrated in the upper portion of FIG. 9, this provides only one DATA SYNCH signal per input character. As described in more detail with respect to FIG. 12 hereinafter, the actual gating of data through the word buffer input gate 200 (FIG. 7) is controlled by a CHAR IN GATE signal generated (FIG. 10) on a line 258 by an OR-circuit 260 in response to operation of either one of two AND-circuits 262, 264. AND-circuit 262 operates at *t4* during the data synchronizing signal to gate actual data characters through the word buffer input gate, and thereafter, once the end of data input has been sensed by the appearance of an EOW signal on a line 266 the AND-circuit 264 controls the word buffer input gate to gate fill characters into the word buffers, one character at each time *t4*. It should be noted that the circuitry described thus far with respect to FIG. 10, and illustrated at the top of FIG. 9, is designed to accommodate lack of synchronism between the input/output console 120 (FIG. 1) and the remaining circuitry of the present embodiment. Thus, even though it is not known when data will be received from the keyboard 118, and although its duration is not necessarily predetermined, this circuit will operate to provide one and only one distinct response to the data received from the keyboard. Additionally, the circuitry herein accommodates the fact that anywhere from two through five data words may be received followed by either a store or an inquire signal, all of which is indeterminant until received by the circuitry herein.

Referring to FIG. 11, the input data on the bus 116 is fed to a binary decoder 268 which decodes the character "*e*," *denoting that the end of the word has been reached. This character would be derived from a code placed on the input bus 116 by the depression of a carriage return key, or the equivalent, in the keyboard section 118 of the I/O console 120. The output of the binary decode 268 is fed to an AND-circuit 270 to cause the setting of a latch 272 at time t3*. When the latch is set, it develops an end of word signal on the EOW line 266. Thereafter, the word buffer then being filled (FIG. 7) would continue to be filled from the fill register 208 until nine characters have been placed in the word buffer. Thus, the end of word signal denotes the period during which the filling of a buffer occurs, when required. Then, the input character counter will be advanced to ten (as described hereinafter, FIG. 10) to cause an AND-circuit 274 to reset the latch 272, thus denoting the end character filling time by a NOW EOW signal on a line 275. As is illustrated in FIG. 9, the AND-circuit 270 is prevented from operating until the DATA SYNCH signal appears, thus to avoid confusion between the counting of actually received data characters and the automatic incrementing of the input character counter during filling of a buffer register, as described more fully hereinafter.

Referring again to FIG. 10, the DATA SYNCH signal on the line 240 is supplied to an AND-circuit 276 which can operate, provided an end of word has not yet been detected as indicated by the NOW EOW signal on the line 275. Thus at time *t2* the AND-circuit 276 will cause an OR-circuit 278 to advance a wrap around counter 280 thus causing it to advance its count. Since the counter is automatically left at a counter setting of zero, the first operation of the AND-circuit 276 will cause the counter to advance in its setting from zero to one. The counter 280 will continue to be advanced during time *t2* of each DATA SYNCH signal, once for each set of data received on the bus 116, until the end of word is detected in FIG. 11. Thereafter, the AND-circuit 276 becomes blocked since the setting of the latch 272 (FIG. 11) prevents the generation of the NOT EOW signal on line 275. However, an AND-circuit 282 is operative (once the end of word is sensed) at each *t2* time, so that thereafter the counter 280 is operated once in each cycle at time *t2*, and thereby sequentially advanced for each fill character. These automatic advancings of the counter 280 will result in filling of the word buffer with characters from the fill register, as described briefly hereinbefore and in detail hereinafter. Once the input character counter 230 has advanced to a count of ten, it first operates the AND-circuit 274 (FIG. 11); this will happen at the first time *t3* following the setting of the counter 280 to a count of 10, as illustrated in FIG. 9. The count of ten is also applied to a delay circuit 284, the output of which is applied to an AND-circuit 286, that is responsive thereto in the presence of a NOT EOW signal at time *t2*, to cause the OR-circuit 278 to advance the wrap around counter from 10 to zero. The delay circuit 284 may have a delay of periods, as indicated in FIG. 9, to ensure that the end of word latch 272 (FIG. 11) will be reset before the counter 280 is restored to a count of zero by the AND-circuit 286. However, after the expiration of the delay in unit 284, the counter 280 is advanced from ten back to zero so that it will reflect a count of one after the first data synchronizing signal is received in a following data receiving period, it also signifies the end of the time when the counter is set to 10, which can be used as a control period indication (such as for resetting the end of word latch 272 in FIG. 11).

In the case where the operator of the I/O console 100 keys in a word which is less than nine characters long, the present embodiment will fill up a word buffer by including the entered characters, and end of word character, and repeating characters of the entered word, as illustrated in Tables 1 and 3 hereinbefore. The end of word character ("*e*") is treated as a regular character insofar as loading is concerned, but it is recognized as the end of word indication so as to sense the number of characters in the input word. To do this, the fill control 222, illustrated in detail in FIG. 12, is responsive to the input character counter 218 at the time of receipt of an end of word character. Specifically, the input character counter output lines 288 (FIG. 12) are applied to a plurality of AND-circuits 290, one respectively corresponding to each input character count from two through eight. Each of the AND-circuits 290 is also responsive to the EOW signal on the line 266 indicating that the word is complete, and a *t*4 timing signal. Each AND-circuit is operable to set a corresponding latch 292, the output of which designates the first fill character on an associated one of a plurality of lines 294. Thus, if the EOW signal is sensed during the second character count, the next character, which has to be filled from the fill register 208, will be the third character position. Similarly, if the end of word is the eighth character received, then only the ninth character needs to be filled by repetition from the fill register 208. The latches 292 are all reset in response to a count of 10 in the input character counter, which is simply a convenient signal of the end of character counting for each input word. In the event that none of the latches 292 is set by the receipt of an end of word signal, then nine or more characters, perhaps including an end of word signal, have been entered from the keyboard 118 and no filling is required. As illustrated in Table 1 hereinbefore, in the event that the input word is more than nine characters long, the word is automatically truncated to a length of nine characters by the simple inability of the system to handle more than nine. This results from lack of character counters signals of one–nine at the character distributor 204. In the event that no fill characters are required, none of the latches 292 becomes set; this will result in a signal from the reset side of each of the latches 292 enabling an AND-circuit 296 to develop a signal (on a line 302) indicating that character selection is to be taken from the I/O unit rather than from the fill buffer. On the other hand, if the input word is less than nine characters long, including the end of word signal, the AND-circuit 296 provides the I/O character select signal until the EOW signal appears. Then, one of the latches 292 will be set to provide an indication of the first fill character; this is applied, in the bottom of FIG. 12, to a plurality of AND-circuits 298, one or more of which operate corresponding OR-circuits 300 to generate a character select signal on a corresponding line 302. The AND-circuits 298 also respond to the input character counter signals on lines 288. Thus, if the first fill character is three and the input character counter is set to three then fill character one will be selected for insertion into character position three. This is also true if the first fill character is nine and the character position coming up is number nine, as indicated by the input character counter being set to a count of nine. On the other hand, if the first fill character is three, then when the fourth character is to be filled, the second character position of the fill register is selected, and so forth. Ultimately, if the first fill character is three, then during the ninth character time (input character counter set to nine) the seventh character of the fill register is selected. Precise timing of the word buffer input gate is provided by causing each of the AND-circuits 296, 298 to respond to the CHAR IN GATE signal on line 258.

Utilization of the fill control signals generated in FIG. 12 occurs in the word buffer input gate 200 illustrated in FIG. 13. The word buffer input gate 200 is a straightforward gate comprising a plurality of AND-circuits 304–312, a plurality of which operate corresponding OR-circuits 316. Thus if the character select signal from FIG. 12 indicates selection of I/O data for loading into the word buffer (as is true until the character following the sensing of the end of word character), then I/O data is gated straight through AND circuits such as AND-circuits 304–306. On the other hand, if character select signals other than I/O are present, then various bit positions of the fill register, based on five bits per character, are selected as input data. For instance, if the character select signal is 1, then bit zero of the buffer input data is selected by an AND-circuit 307 from bit zero of the fill register; bit one of the buffer input data is selected by an AND-circuit 308 from bit one of the fill register, and bit four of the buffer input data is selected by an AND-circuit 309 from bit four of the fill register. But if the character select signal calls for selecting character 7, then bits zero, one and four are selected from bits 30, 31 and 34 of the fill register 116 by related AND-circuits 310, 311 and 312.

The outputs of the AND circuits are collected by corresponding OR-circuits 316 so as to provide buffer input data signals on the trunk of five lines 202. Thus, the word buffer input gate selects for application to the word buffers, I/O data on a character by character basis until the end of word character is sensed. During the time that I/O data is placed in successive character positions of a selected word buffer, the fill register is also loaded on a character by character basis. After the end of word character is loaded into one of the word buffers 210–214, if less than nine characters have been entered therein, then characters are selected from the fill register 208 to fill the remaining character positions of the selected word buffer 210–214, repeating as many as necessary of the already loaded characters. But note that the high orders of the fill register 208 (FIG. 7) are simultaneously loaded, with its own low-order characters if necessary, until it is filled, or until loading of the buffers is completed. The circuitry of FIG. 12 presumes that two characters will be entered, one character being the character of the word (such as "*a*") and the second character being the end of word character. If this is not true, then the principles of the present embodiment will not function properly; this could be detected simply by providing an additional AND-circuit 290 (FIG. 12) to sense the combination of an end of word character with an input character count of 1 to operate an alarm or other indication. On the other hand, since the end of word character is presumed to be generated by a carriage return in the keyboard 118, failure to receive an end of word character will simply cause the system to wait until one is received.

Characters selected by the word buffer input gate 200, applied in a five-bit binary code to the trunk of five lines 202, are distributed by the character distributor 204 (FIG. 7), which may take the form of the distributor 57 illustrated in FIGS. 1 and 17 of U.S. Pat. No. 3,440,615. The character distributor 204 herein simply distributes the five bits of each input or fill character to a successive, selected one of nine character positions at the input to all of the word buffer registers 210–214 and the fill register 208. The particular one of the word buffer registers 210–214 which will receive the character on the bus 206 is determined by the input word counter 224 which selects successive ones of the word buffers 210–214, as successive nine character words are loaded. The fill register 208 is responsive to anything on the bus 206.

The input word counter 224 is illustrated in FIG. 14. Therein, the counter per se 318 comprises a five stage counter which counts from one through five and must then be restored to a count of one by a signal on a line 320. This signal is generated by a single shot 322 in response to the setting of a latch 324 which occurs at the first time t3 that the input character counter is set to a count of one, as sensed by an AND-circuit 326. However, the latch 324 is not reset by an OR-circuit 327, and a transition into the set state to operate the single shot 322 cannot occur, until after all loading of all characters into as many of the word buffers as is required is completed, as indicated by a LOAD PERIOD signal on a line 330 or until an operator mistake signal (OPER MISTAKE) is received on a line 329. The generation and nature of the LOAD PERIOD signal is described more fully with respect to FIG. 15, hereinafter. The open end counter 318 is advanced in count by an AND-circuit 332 in response to a single shot 334 which provides one pulse upon the transition of a latch 336 from a reset state to a set state. The latch 336 is set by an AND-circuit 338 each time t2 when the input character counter is set to one. The latch 336 remains set until the input character counter reaches 10, when it is then reset. Once set, attempts by the AND-circuit 338 to again set the latch 336 have no effect since the latch remains set and only a transition from the reset state to the set state will cause the single shot 334 to provide a pulse through the AND-circuit 332 to advance the counter 318. Notice that the latch 324 not only provides, through the single shot 322, a signal to reset the input word counter at the start of an operation, it also controls the advancing of the input word counter to be permitted through the AND-circuit 332 only between time 3 of the first setting of the character counter to 1, and the end of the final advancing of the input character counter as indicated by resetting of the latch 324 by the LOAD PERIOD signal on the line 330. Thus, the latch 324 is set only once during a given sequence of input words, whereas the latch 336 will become set and reset once for each word which is entered into the system from the keyboard 118. The operation of the input word counter is illustrated near the bottom of FIG. 9. The circuitry of the input word counter 224 is so arranged that it is immaterial at what setting it may have been left in previous word entry operations. For instance, as illustrated in the bottom of FIG. 9, assuming that the input word counter had previously been set to a count of three, the first time that the latch 336 is set it causes the single shot 334 to apply a signal to the AND-circuit 332. However, the AND-circuit 332 is not operative because the latch 324 is not yet set, and won't be until time t3. The period of the single shot 334 is kept less than one of the time periods (t2) so that its signal will have disappeared by the time the AND-circuit 332 is enabled for the first time as a result of the initial setting of the latch 324. However, at time t3, the latch 324 becomes set and causes the single shot 322 to reset the counter to indicate the first input word. In other words, the first input word is designated by a reset, rather than by an advancing of the counter. However, for subsequent words received in the same set of input words, the latch 324 will be set prior to the next setting of the input character counter to 1, so that the AND-circuit 332 will thereafter respond to transitions of the latch 336 from the reset to the set state at time t2 of each setting of the input character counter to one. Thus, without regard to whether two, three, four or five words were received in the last previous setting, the input word counter will automatically start off with a count of one at the start of word loading, and will achieve this setting soon enough to steer the input word into the word one buffer 210 (FIG. 7). The input word counter will maintain this word setting until a subsequent word is received. This is advantageous in view of the fact that the circuitry does not know until it receives something from the keyboard whether it will receive another word or a store or inquire signal indicating that all words have been received. The arrangement of FIG. 14 provides proper setting of the counter at the proper times to both control the flow of words directly into the correct word buffer and to designate, after each word is loaded, how many words have been loaded for setting of the group counter (as described briefly with respect to Table 5 hereinbefore and in detail hereinafter).

The OPER MISTAKE signal on line 329 may be generated in the keyboard 118 (FIG. 1) by an error key, which can be pressed after an EOW is generated. Except for input character counting and word counting, all other operations prior to receipt of a STORE or INQUIRE signal are automatically caused to complete a cycle. Thus, on error, if the word counter is conditioned (resetting of latch 324) to start at a count of 1, the operator can reenter the set of words without affecting the system. The output of the open end counter 318 comprises the distinct input word counter signals on a plurality of lines 340.

The details of the symbol input gate 228, word load control 230 and symbol compare circuitry 232 are described hereinafter, following the detailed description of the controls of FIG. 8, inasmuch as they are intimately dependent thereon.

CONTROLS DETAILS: FIGS. 15–17

The store/inquire and load period control 238 is illustrated in detail in FIG. 15. This circuitry simply recognizes the energizing of the STORE line 124 or the INQUIRE line 126, indicating that the operator has completed entering words for a store or an inquire operation, respectively. It should be noted that in this embodiment, any number of words from two (on inquire) or three (on store) to five (in either case) may be entered at the option of the operator, and the only way the system knows when the set of entered words is complete is by the operator causing signals on the store or inquire lines, appropriately. The store/inquire and load period control 238 of FIG. 15 provides timing and logical control so as to ensure proper operation without the possibility of false settings or spurious signals. The control 238 generates a STR signal on a line 342 or an INQ signal on a line 344, a respective one of which is present from the time that the operator is through entering words into the buffers until the time that all possible combinations of triplets or pairs of words, respectively have been loaded into storage (and the responses have been handled by the output circuitry hereof in the case of an inquire operation). Additionally, the circuit 238 of FIG. 15 provides a respective one of a pair of short signals indicating the start of the store or inquire period; thus at the start of a store period, a BEGIN STR signal is generated on a line 346 and at the beginning of an inquire period a BEGIN INQ signal is generated on a line 348. The STR signal on line 342 and the INQ signal on the line 344 are ORed in an OR circuit 350 to generate the LOAD PERIOD signal on the line 330; similarly, the BEGIN STR signal on the line 346 and the BEGIN INQ signal on the line 348 are ORed in an OR-circuit 352 so as to generate a short duration, BEGIN LOAD PERIOD signal on a line 354. At the upper left of FIG. 15, a latch 356 is set by the STORE signal on the line 124 (indicating that the operator is through entering words) and the latch 356 will remain set until the appearance of the STR signal on the line 342, at which time the latch 356 is reset. When the latch 356 is set, an AND-circuit 358 will operate, once the input character counter has reached zero as indicated by a signal on the line 288, provided a latch 360 is in the reset state. The AND-circuit 358 also requires an input from a delay circuit 362 which provides a signal just slightly delayed from time t1. The purpose of this is to allow a latch 364 to be reset every time t1, and to be set immediately following that time t1 at which the store signal is present and the input character counter had reached zero. When the latch 364 is set, it immediately sets the latch 360, which in turn blocks any further operation of the AND-circuit 358, thereby preventing any further setting of the latch 364, which is reset on the following time period t1. The latch 360 will remain set until such time as an AND-circuit 366 (bottom of FIG. 15) senses that the group counter is set to zero, as indicated by a signal on a related line 368, in other than the beginning of a load period. Since the beginning of the load period is manifested by the setting of the latch 364 (or a comparable latch relating to the inquire operation), and since the group counter (as described more fully hereinafter with respect to FIG. 17) is preset to a value commensurate with the setting of the input word counter during either the begin store period or the begin inquire period (either of which is commensurate with the begin load period), the group counter will not be set at zero at the end of begin load period. Thus, the AND-circuit 366 is prevented from operating by a NOT BEGIN LOAD PERIOD signal on a line 354*a* (which signal is a complement of the BEGIN LOAD PERIOD signal on line 292 and may be formed by an inverter by ORing the reset sides of latches 336, 372, or by utilizing inverse logic inherent within the implementation of the OR-circuit 352, which has been eliminated herefrom for simplicity). It follows that the AND-circuit 366 can provide a signal on a line 369 to reset the latch 360 only when group counting has been reduced to zero as a result of the apparatus having loaded a requisite number of pairs or triplets of words into memory. In fact, the way in which the apparatus recognizes the completion of the loading operation is by the AND-circuit 366 resetting the latch 360. Also shown in FIG. 15 are three latches 370–372, a delay circuit 374, and an AND-circuit 376. These operate in the same fashion as has been described for the latches 356, 360 and 364, the delay unit 362 and AND-circuit 358 and will not be described further.

In FIG. 16, the load cycle counter 234 comprises a simple wrap around counter circuit 378 which is advanced by one count in response to each signal received from an OR-circuit 380 in response to any one of three AND-circuits 382–384. The AND-circuit 382 will operate at every time *t*1 during the load period of a store operation as indicated by a STR signal on the line 342. The AND-circuit 383 performs a similar function in response to the INQ signal on line 344 during inquire operations; however it also requires the presence of a NOT OUTPUT PERIOD signal on a line 386 to indicate that, in the case of an inquire operation, the handling of responses received from memory as a result of loading inquiry pairs into memory has been fully accomplished before the next pair can be handled, as described more fully hereinafter. The load cycle counter 378 is advanced from 1 through 5 during inquire operations, and is precluded from wrapping around back to 0 until handling of responses is complete. The line 386 is also applied to the AND-circuit 384 so that the restoration of the load cycle counter from a count of five to a count of zero cannot occur during the handling of responses as just described. However, during a store operation, or upon completion of handling of responses in the output circuitry 130 herein, the AND-circuit 384 will respond to the RESET LOAD PERIOD signal on the line 369. The operation of the circuit of FIG. 16 thereby designates each of the load cycles of Table 5 as being from the start of one time t1 to the start of a subsequent time t1. The wrap around counter 378 provides distinct load cycle signals for cycles zero through five on related lines 388. Load cycle zero is connected to the input of an AND-circuit 390 together with the STR signal on line 342 and a *t*1 timing signal. It is also connected to the input of an AND-circuit 392 together with the INQ signal of the line 344 and the NOT OUTPUT PERIOD signal on the line 386. The AND-circuits 390, 392 are duplicates of the AND-circuits 382, 383, but serve to generate the RESET MEM LOGIC signal on the line 188. Each of the AND-circuits 390, 392 drives a related single shot 394, 396 the outputs of which are ORed in an OR-circuit 398 to provide the signal on the line 188. This arrangement allows recognizing the signal that will advance the load cycle counter from zero to one, setting the related single shot 394, 396 before the load cycle zero signal is lost as a result of advancing the wrap around counter 378, and providing a signal of sufficient length to do a proper resetting of the two-bit binary counter 186 in the logical memory cell 150 (FIG. 6, as described hereinbefore).

When load cycle 5 appears, either one of two AND-circuits 399*a*, 399 *b*, may operate a related single shot 399*c*, 399*d* and a corresponding driving amplifier circuit 399*e*, 399*f*. Which of these circuits operates depends upon the appearance of a STR signal on line 342 or an INQ signal on line 344. These will operate at time *t*2 during cycle 5. The single shots 399*c*, 399*d* are provided with a suitable timing characteristic so as to generate a signal of the proper duration to operate the logic circuits within the logical memory cell 150 (FIG. 6) in logical memory 100. The driving amplifier circuits 399*e*, 399*f* provide a signal of a suitable polarity onto the ± R line 128 so as to cause either the registering of a logical one in a memory cell having responded to all three words of a store triplet, or to provide a minus R signal to cause a fail signal in a memory cell having responded to both words of an inquiry pair with its logical storage latch 180 in the reset condition (as described with respect to FIGS. 1–6 hereinbefore.)

Referring again to Table 5, the load cycles are utilized to load various of the input word buffers into storage, operate the logical storage for either an inquire or a store operation, and designate completion of the load or the inquire operation. Specifically, pairs may be loaded in cycles one and two, cycles two and three, or cycles one and three. Triplets are loaded in cycles one, two and three. In cycle four, any repeated symbol (see Tables 1–Table 4, hereinbefore) is loaded. In the fifth cycle, either a positive R signal or a minus R signal is delivered to the logical storage, in dependence upon whether store or inquire operation, respectively, is to be performed.

The group counter circuitry 236 is illustrated in FIG. 17. The function of the group counter is to accommodate the total number of input words which have been entered into the system by the operator: there can be a various number of groups (inquiry pairs or store triplets), as illustrated in Table 5, hereinbefore, which are designated by related signals on the lines 368. In FIG. 17, a plurality of AND-circuits 400–406 perform this function. Thus, if only two words are entered, then with the appearance of the BEGIN INQ signal on the line 348, the AND-circuit 400 will operate causing an OR-circuit 408 to generate a signal on a line 410 which in turn will cause presetting of a count down counter 412 to one. Similarly, if three input words are provided and a store operation is indicated by a signal on the BEGIN STR line 346 then the AND-circuit 401 will similarly operate the OR-circuit 408 to indicate that only one group of words (a triplet) is to be stored (preset to one). If three input words are provided in an inquire operation, the AND-circuit 402 will provide presetting of the group counter to three; if four input words are provided in a store operation, the AND-circuit 403 will provide presetting to four. If four input words are provided on an inquire operation, then the AND-circuit 404 will provide presetting to six. If five input words are provided, then for either an inquire operation or a store operation an OR-circuit 414 will respond to the respective one of the AND-circuits 405 or 406 to provide presetting to 10, since 10 input words will provide either 10 pairs or 10 triplets, as indicated in Table 5, hereinbefore. Thus, the countdown counter 412 is preset to a proper value during the beginning of a load period (either begin store or begin inquire). Thereafter, when the BEGIN LOAD PERIOD signal disappears from the line 354*a*, an AND-circuit 416 will be operated during time t4 of the predecessor to the five loading cycles, in view of a LOAD CYC O signal on the line 388, to advance the countdown counter 412 to the next lower setting; the group counter is operated in a similar fashion until such time as the group counter is set to zero, indicating that all groups have been loaded into storage. Thus, for each triplet or pair and corresponding operation of logical storage (plus R or minus R), the LOAD CYC O signal online 388 will cause the AND-circuit 416 to step the countdown counter 412 down by one count. It is in this fashion that the system is able to match up pairs and triplets and cause them to be loaded automatically into logical storage.

WORD LOAD, SYMBOL COMPARE AND GATE: FIGS. 18–22

The symbol compare circuit 232 is illustrated, with much of it broken away, in FIG. 18. This circuit is rather trivial, in a logical sense, and serves to detect the similarity between words, as illustrated in Tables 3 and 4. Each character of each word in the word buffers is compared on a character by character basis with every other word in the buffer. In the embodiment illustrated in FIG. 18, this is done in sets; thus "word one" being compared with "word two" is done in a set designated WD1/WD2. It generates an equal signal and a not-equal signal for each character (one through nine) in the WD1/WD2 set. As a specific example, consider the comparison of the first character of word one with the first character of word two. This is accomplished by a plurality of EXCLUSIVE OR circuits-420–422, etc., each of which compares one of the binary bit positions of the related pair or word buffers. In the example under consideration, binary bit zero of the character one position of the word one buffer, is compared with bit zero of the character one position of the word two buffer in the EXCLUSIVE OR-circuit 420. Similarly, binary bit three of the character one position of the word one buffer is compared to binary bit three of the character one position of the word two buffer in the EXCLUSIVE OR-circuit 421. The binary four bits are compared in EXCLUSIVE OR-circuit 422, etc. In the case where character one of the word one buffer is identical to character two of the word two buffer, none of the EXCLUSIVE OR circuits can operate since both inputs will be present on each of them. In such a case, no signal will be generated to operate a related OR-circuit 424 and so a corresponding latch 426 will not be set. The latch 426 is reset at the start of a loading period by the BEGIN LOAD PERIOD signal on the line 354 to ensure that any of the symbol compare latches set, are in fact set during the current operation. When reset, the latch 426 generates a CHAR 1=signal on a related line 427. On the other hand, if any of the bits in the character one position of the word one buffer differ from a related binary bit of the character one position of the word two buffer, then the related exclusive OR-circuits 420–422 etc., will operate causing the OR-circuit 424 to set the related latch 426. With the latch set, a CHAR 1 ≠ signal is generated on a related one of a plurality of lines 428. The output signals from the symbol compare circuit 232 of FIG. 18 are utilized as described hereinafter to control the passing of binary characters through the symbol input gate 228, as described briefly hereinbefore and more fully hereinafter.

Figure 19:
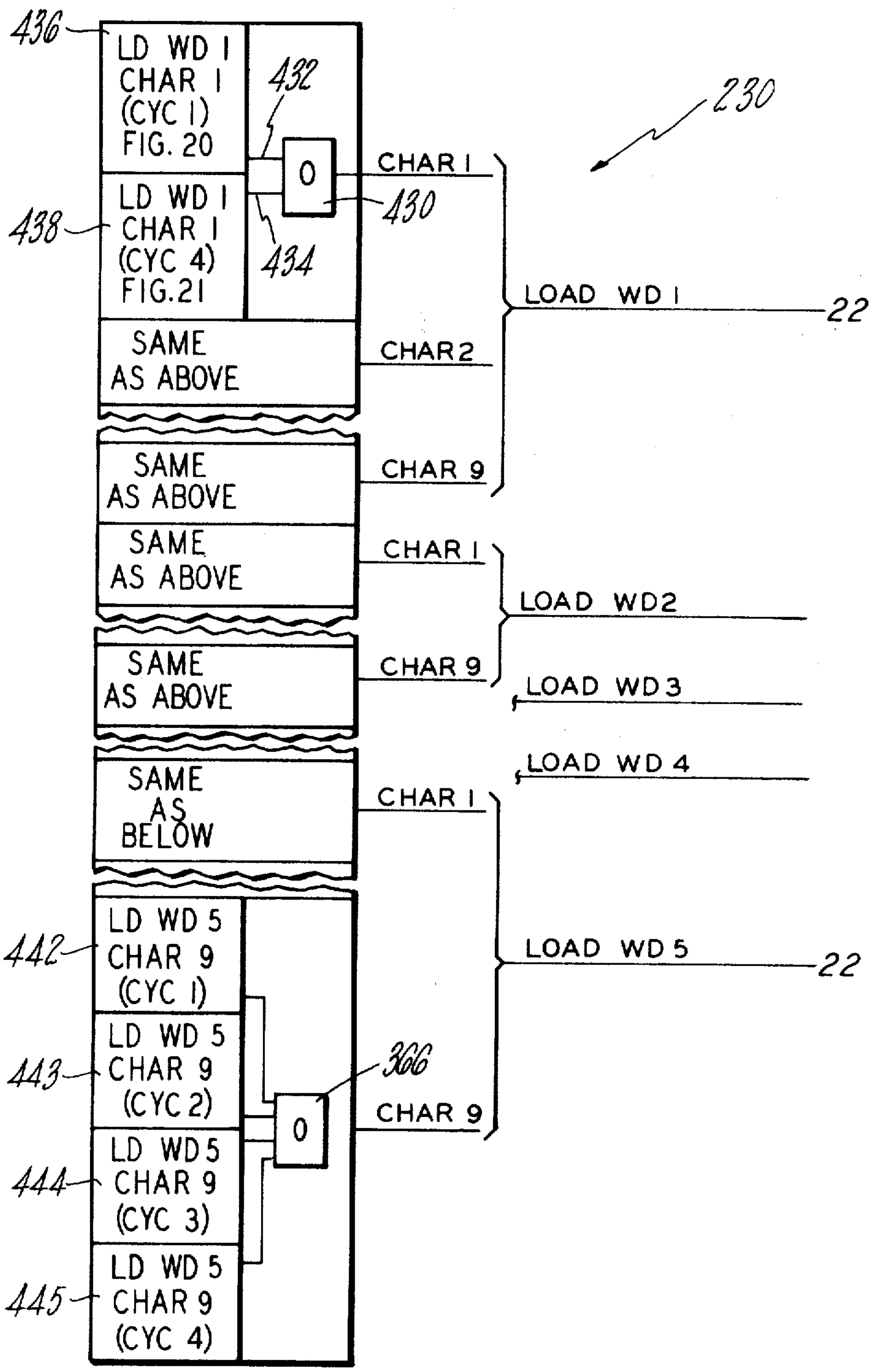

The word load control circuit 230 is illustrated broadly in FIG. 19 and comprises a control circuit for each character of each word. For instance, nine different control signals are provided for word one, nine different signals for word two, etc., down through the nine different signals provided for word five. Each of these signals is generated by a related control circuit which includes an OR-circuit 430 responsive over lines 432, 434 to any one of two through four circuits 436, 438 etc. For word one, the circuit 436 controls loading word one, character one, during cycle one, which is the normal load operation; the other circuit 438 controls loading word one, character one, during cycle four, which is the time during which any repeated characters are loaded, as illustrated in Tables 1–5 hereinbefore. Referring for example to Table 2; since character two or word one is the same as character two or word two all of word one is stored during cycle one except for character two; and in cycle two, all of word two is stored except character two. During cycle three, word three is stored. In cycle four, the letter O, which comprises character two of both word one and word two, is stored in order to complete the triplet. Thus, referring to Table 5, since word one is stored only in cycle one (except in the case where a repeated character must be stored in cycle four), only two circuits 436, 438 (cycle one and cycle four) are required to provide suitable signals through the OR-circuit 430 to control loading of the successive characters of word one. Similarly, reference to Table 5 shows that word two is always loaded during cycle two and repeated symbols for character two are similarly loaded in cycle four. Thus, the word two circuitry for each character is similar to the circuitry 430–438 for character one of word one. This also holds for word three. However, word four may be loaded in cycle one (in the third group of a four word store), in cycle two (in the second group of a four word store), in cycle three (in the fourth group of a four word store), etc. Thus, controls must be provided to store word four (except for any repeated symbol) during cycles one, two and three, and to store the repeated symbol of word four during cycle four. This is also true of word five, which may be loaded in any one of three cycles except for repeated symbols, and the repeated symbol may be loaded during the fourth cycle. Thus, at the bottom of FIG. 19, an OR-circuit 440, exemplary of the circuitry which generates symbols for loading character nine of word five, is responsive to four different circuits 442–445, one for each of cycle one, cycle two, cycle three, and cycle four. The specific circuitry utilized to provide signals to the OR-circuits 360 ... 366, etc., relates simply to Tables 1–5 as described hereinbefore; in other words, the circuitry reflects the fact that a word is to be loaded in a given cycle depending upon the total number of input words (the group count setting) and whether or not a repeated symbol is used, in which case all of the word except the repeated symbol is loaded in the appropriate cycle, after which the repeated symbol is loaded once only, in cycle four.

Exemplary detailed circuitry is illustrated in FIGS. 20 and 21. The loading of character one of word one is always accomplished for normal loading purposes in cycle one, unless character one is a repeated character (that is, a character equal to the character one position of any of words two through five). The loading of character one of word one during cycle one (FIG. 20) is done in response to a signal on the line 432 which is generated by an OR-circuit 446. The OR-circuit 446 responds to a plurality of AND-circuits 448–457, all of which are responsive to a gating signal on a line 458 that is generated by an AND-circuit 460 at time *t2* during load cycle one. The remaining signals applied to the AND-circuits 370–379 correspond to the various conditions of Table 5. Most specifically, one AND-circuit is provided for each of the groups which may be loaded that would include word one, provided that a given character (in this case character one) of word one is not equal to a character of another word of the particular group involved. For instance, if the group counter is set to one, and the total number of input words is two, then the only possible word with which word one need be compared is word two (as illustrated in Table 5). On the other hand, if the group counter is set to one, and a store operation is involved, then word one has to be compared with both word two and word three. Any character of word one which is completely equal to the like character of the other words in the group will not be stored during cycle one, but will be stored during cycle four instead. As examples, consider the AND-circuit 448 which operates when the group counter is set to one, provided character one of word one does not equal character one of word two. This will operate during either the store or inquire operation, and in a sense can be considered to be the AND-circuit which will do the "normal" loading of character one of word one during group one. A related AND circuit is the AND-circuit 449 which will load character one of word one, provided that character one of word one is not equal to either word two or word three, during a store operation. The AND-circuits 450 and 451 relate to a group counter setting of two. The AND-circuit 450 will load character one of word one in either an inquire or a store operation provided character one of word one does not equal character one of word three; similarly, the AND-circuit 451 will cause the loading of character one of word one in the second group of a store operation provided character one of word one does not equal either character one of word four or character one of word three. The remaining AND-circuits 452–457 similarly take into account the indications of Table 5 to provide loading of character one of word one in any of the pairs or triplets indicated in Table 5 during a corresponding setting of the group counter, provided that the indicated character of word one is not equal to a like character of the other word of the pair during an inquire operation, or either of the two other words of the triplet during a store operation. FIG. 21 can be considered to be the contraposite of FIG. 20 in the sense that the signal on the line 434 is generated by a related OR-circuit 462 in response to any one of a plurality of related AND-circuits 464 during cycle four of any group in which word one is contained when another word in the group (either the other word of a pair on an inquire operation or either of the two other words of a triplet in a store operation) has the same character one as character one of word one. Since the circuit of FIG. 21 is simple logic, and very similar to that of FIG. 20, further description is omitted herein. Thus, the outputs of FIGS. 20 and 21 combined in the OR-circuits 430 in FIG. 19, provide load signals for word one, character one; similar circuitry, illustrated briefly and broken away in FIG. 19, provide loading signals for each character of each word.

As illustrated in FIG. 22, the individual word and character loading signals generated in FIG. 19 are applied to a plurality of AND-circuits 466 in the symbol input gate circuit 228. Each set of five AND circuits comprises a character gate to load a related character on a bus of five lines 467 from a related one of the word buffers into a related portion 468–470 of the symbol encoder 110 through corresponding groups of OR-circuits 472–474. Since only one of the word buffers can be loaded into memory in each cycle, no gating is required except for the AND-circuits 466. The OR-circuits 472 are connected to the AND-circuits 466 relating to the five-binary bits of character one of all five word buffers; the OR-circuits 473 are connected to the AND-circuit 466 relating to the five-binary bits of character two of all five word buffers; and in a similar fashion, all of the other OR-circuits are related to all five-binary bits of a given character of each of the five word buffers. Thus, in response to a signal, such as LD WD1, five of the AND-circuits 466 will pass signals from character one of the word one buffer into a corresponding five OR-circuits 472; the character one position of other word buffers will pass signals from five of the AND-circuits 466 into the OR-circuits 472; in a similar fashion, there is a set of five OR-circuits 472, 473 . . . 474 which relates to the similar character position of all five of the word buffers. Each of the OR-circuits 472 473 . . . 474 will pass five binary signals, each set of five signals corresponding to the binary code of the given character, to a related one of nine portions 468–470 of the symbol encoder 110. Each of the symbol encoder portions 468–470 is a circuit, such as a diode matrix or the equivalent, capable of taking any five-bit binary combination and encoding it into one out of 31 symbols. For each of the nine character positions, the symbols may comprise the 26 letters of the alphabet, a blank symbol, an end-of-word signal, open and closed parentheses, and a hyphen The encoding for each symbol is different for each character position. Thus the symbol "A1" is encoded differently than the symbol "A2," meaning that the symbol for the letter A in the first character position differs from the symbol for the letter A in the second character position. Referring again to FIG. 22 and FIG. 1, 31 symbols of each of nine portions 468–470 of the symbol encoder 110, totaling together 279 possible symbols, are applied to the bipolar random encoder 102 (FIG. 1) for random encoding and entry into the logical memory 100. This operation has been described in detail with respect to FIGS. 2–6 hereinbefore. One symbol, the apostrophe, for each of nine character positions does not provide outputs from the symbol encoder 110. This is because it represents a nullity, not encodable, and not an internal member of the logical memory pattern.

In the case of a store operation, the loading of at least one triplet, and perhaps more triplets, depending upon how many input words are provided by the operator (as illustrated in Table 5 hereinbefore) completes the store operation, and all of the circuitry described thus far is utilized therein. However, in an inquire operation, the loading of one or more pairs will cause a response for each pair loaded, provided that pair does cause logical recognition as a result of one or more triplets loaded previously. In such a case, the logical memory 100 will provide less than a complete set of failing symbols so that the bipolar random encoder 102 will supply less than 279 failing symbols on the lines 108 which are applied to the output circuitry 130.

OUTPUT CIRCUITRY: FIGS. 18 and 23–29

In FIG. 23, the output circuitry 130 is informed of the fact that an inquire operation is underway and that the logical memory 100 (FIG. 1) will be sending response elimination or fail signals through the bidirectional random encoder 102 and over the trunk 108 of 279 lines to the output circuitry 130 (FIG. 23) by the receipt (at output period and scan circuitry 480) of the INQ signal on line 344 and LOAD CYC 5 signal on the line 388.

First, the output period and scan circuitry 480 removes the NOT OUTPUT PERIOD signal on the line 386 so that the load cycle counter 234 (FIG. 16) cannot advance from load cycle five until the testing and data handling of all possible responses has occurred, following a receipt of symbol elimination signals from logical memory 100. The circuit 480 then causes all of 288 symbol response registers 482 to be preset; this means that each of the registers is set to indicate a condition of a successful response so that the symbol elimination signals on the lines 108 can selectively reset those registers for which an elimination or fail signal is received, as described more fully with respect to FIGS. 1–6 hereinbefore.

Referring to FIG. 24, the output preset signal on line 484 is applied to 279 latches 486, each of which relates to one of the 279 symbols which can participate in the information stored in logical memory. The output preset signal on line 484 also presets nine latches 488, each relating to the apostrophe, for one of the nine character positions; as described hereinbefore, the apostrophe represents nullity in this system: that is, the apostrophe is a way for the outside world (the I/O console 120) to cause nothing to be stored in the logical memory 100, and it is a way for the inside world (the logical memory 100) to inform the outside world that no response is possible since all possible response elimination signals have been received for a given character position.

The presetting of the latches 486, 488 occurs prior to the time that any symbol elimination signals can appear on the lines 108. However, when any such signals do appear, they are applied to related OR-circuits 490, which OR-circuits respond to the negative signals on the lines 108 to reset the corresponding one of the latches 486. Note that no symbol elimination signal lines 108 are applied to similar OR-circuits 492 which correspond to the latches 488. Thus, all of the latches 486, 488 are initially set just before the time when a response could come from logical memory, and thereafter, those cells which cannot be in a response to an inquiry pair cause selective resetting of the related ones of the latches 486. This leaves all of the latches 488 in the set condition.

Next, the output period and scan circuitry 480 (FIG. 23) causes a series of 32 scan signals over a trunk of 32 lines 494 to a plurality of AND-circuits 496 ... 498 which act as output gates to the symbol response registers 482 (FIG. 24). During the time of the first scan pulse (scan 1), all symbols relating to the character A (such as A1, A2 ... A9) are tested; similarly, each of the 32 possible characters are tested in sequence by the scan pulse being applied to related AND-circuits 496, 498. Each of the AND-circuits 496, 498 also have applied thereto signals on lines 500, 502 which indicate that during the current scan period, no other symbol for that character position has as yet had a response. For instance, if a response elimination signal is received for the symbol A1 (top of FIG. 24) so that its related AND-circuit 496 operates and causes an output allowing A1 to become a portion of the output response, then prior to scan time 2, the CHAR 1 NO RSPNS signal will disappear from line 500 to prevent any other symbol from reading out during the current 32 bit scan; this permits only one symbol output per character per scan. In a similar fashion, the CHAR 9 NO RSPNS signal on line 502 will disappear within the scan time at which any of the symbols for character 9 cause a response through a related one of the AND-circuits 498. All of the remaining symbols (broken away in FIG. 24 for simplicity) operate in a similar fashion. Additionally, once any AND-circuit 496 ... 498 provides an output, it applies a signal to the corresponding OR-circuit 490 to reset the related symbol latch 486. Thus, the latches 486 can either be eliminated from operating as a result of symbol elimination signals on the lines 108, or can be eliminated from further operation once their set condition has been tested. By the time scan pulse 32 is reached, if none of the symbols relating to the given character has caused an output through a related AND-circuit 496, then the related apostrophe latch 488 will still be in the set condition and the no response signal on the related one of the lines 500 ... 502 will still be present so that the corresponding apostrophe latch 488 can be read out through the related AND-circuit 496 ... 498. On the other hand, should any symbol relating to scan pulses one through 31 (that is symbols A1 through *b*1) cause an output, that fact will cause a signal on a related line 504 ... 506 to reset the related apostrophe latch 488. As described in more detail hereinafter, since more than one symbol may not be eliminated in a given character, the 32-bit scan of successive symbols, simultaneously in all nine characters, is repeated until all of the uneliminated symbols for each character position have been read out as an output, all the way to the printer 134 of the I/O console 120 (FIG. 1). Resetting of the apostrophe latches 488 in addition to blocking the AND-circuits 496 ... 498 (by eliminating the signals on the lines 500–502) is to prevent the apostrophe from reading out on any scan in the event that any symbol in the related character has caused a readout in the current or any previous scan. The outputs of the AND-circuits 496 ... 498 comprise response symbols in related ones of 288 lines 508. During each scanning from scan pulse 1 through scan pulse 32, one RESPONSE SYMBOL signal may be provided on the related lines 508 for each of the nine characters. The lines 508 are connected to respective ones of nine character encode matrices 510 (FIG. 23) to provide a five-bit binary code manifestation of the character related to any set symbol, which is passed over five related ones of a trunk of 45 lines 512 to nine output character registers 514, each relating to one of the character positions of an output word, each including five-binary bits. Thus, for each excursion of the 32 bit scan, any of the nine character positions of an output word may have the related character stored in the output character registers 514. When scan 32 is reached, the content of the output character register 514 is passed over trunk of 45 lines 516 through nine output character gates 518, one character at a time, onto the trunk of five lines 132 which carry the nine different characters of a word serially, character by character to the printer 134 of the I/O console 120 (FIG. 1).

The lines 508 are also applied to a response test circuit 520, the details of which are illustrated in FIG. 25, and include nine OR-circuits 522 ... 524 and nine latches 526 ... 528. Any RESPONSE SYMBOL signal on one of the lines 508 will cause the related OR-circuit 522 ... 524 to set the corresponding latch 526 ... 528, thus providing a signal (such as RESCAN CHAR 1) on a related line 530 ... 532. This indicates to the scan circuitry (480, FIG. 23) that the symbols have not been exhausted prior to the current scan, and that therefore there may yet be additional symbols which have not been read out or eliminated. The OR-circuits 522 also generate the reset signals on the lines 504, 506 as described with respect to FIG. 24 hereinbefore. Once any of the latches 526 ... 528 are set, they no longer generate the NO RSPNS (no response) signals on the lines 500 ... 502, thereby causing the related symbol registers to no longer be capable of being read out, as described with respect to FIG. 24, hereinbefore. Once set, the latches 526 ... 528 will remain set until characters relating to symbols read out during this current scan period have been completely gated out, one at a time, through the output character gates 518 (FIG. 23). When that is completed, the output period and scan circuitry 480 provides a CHAR OUTPUT CMPLT signal on a line 534 which resets the latches 526 ... 528 to allow them to monitor testing of the symbol registers during a subsequent scan thereof.

Referring now to FIG. 26, the output period and scan circuitry 480 includes an output period latch 536 which indicates, when set, that testing and data handling of symbols not eliminated as a result of an inquire pair having been loaded into logical memory 100 is in process. The latch 536 is set by an AND-circuit 538 at time *t*2 during load cycle 5 of an inquire operation. In the transition from the reset to the set state, the output of the latch 536 causes a single shot 540 to generate the output preset signal on the line 484 so that all of the symbol response registers 482 will be set prior to receipt of possible symbol elimination signals from logical memory 100. When set, the latch 536 provides an OUTPUT PERIOD signal on a line 542 that is used within FIG. 26 to allow the setting of an AND-circuit 544 at the immediately following time *t*3. This AND-circuit drives a delay circuit 546 to provide a START SCAN signal on a line 548 which passes through an OR-circuit 550 to trigger a scan pulse generator 552. The scan pulse generator 552 may comprise a series of single shots that will provide a series of 32 sequential timing pulses on the SCAN lines 494. The period of each pulse should be long enough to permit a "*b*" output to reset an apostrophe latch. The delay unit 546 is adjusted to have a sufficient delay to accommodate propagation time for the symbol elimination signals to reach the symbol response registers following the generation of the minus R inquire signal (FIG. 16). This is illustrated in the center of FIG. 18. Then follows the first scanning of the symbol response registers, as described hereinbefore. Once scan pulse 32 is reached (meaning that all possible symbols including apostrophes have been tested) the scan 32 signal will cause the setting of a latch 554 the output of which comprises the SCAN 32 LATCH signal on a line 556.

In the output clock and character select circuit 557 in FIG. 27, the SCAN 32 LATCH signal on line 556 is applied to an AND-circuit 558 which gates the output of a multivibrator 560 or other suitable clock signals source, onto the line 136 which carries the OUTPUT CLK signals to the I/O console 120 (FIG. 1). Due to inherent logic delay, the clock pulses on line 136 will not start until the apostrophe latches 488 (FIG. 24) have had time to be tested. The line 136 is also connected to advance a ten stage open end counter 562. This counter may be any one of a number of well known types which can be reset to a lowest-most count, and then successively advanced through a sequence of counts to a high count, after which it becomes insensitive to further advancing signals. In fact, as employed herein, the counter 562 may be considered to be an 11 stage counter, being reset to a count of zero (which is a nullity or unused position) and then advanced to a count of 10 where it will remain until again reset to zero. In response to each clock signal on the line 136, the counter 562 will advance from zero to one, from one to two, and eventually from nine to 10. For each of the counts one through nine, signals are applied over related lines 564 to gate each of the nine characters out, successively, one character at a time in sequence, in the output character gates 518 (FIG. 23).

When the count of 10 is reached, a signal on a line 566 is applied to the output period and scan circuitry of FIG. 26, to cause an AND-circuit 568 to generate the CHAR OUTPUT CMPLT signal on the line 534. This is applied to the response test circuitry of FIG. 25 to cause resetting of the test latches, as described hereinbefore. This signal is also applied to reset the output character registers 514. This signal denotes the completion of data handling for the first complete scanning of the symbol response registers 482 (FIG. 23). In the present embodiment, for simplicity, the circuitry is arranged to repetitively scan all of the symbol response registers until a complete scan has been had with no response, thus guaranteeing that any noneliminated symbols, or an apostrophe, have been read out for all nine characters, without regard to the number of symbol elimination signals which might have been received for any character. With the presence of the character output complete signal on line 534, the response test circuitry 520 and the output character registers 514 are reset and ready for a subsequent scan. The signal on line 534 is also applied in FIG. 26 to allow the operation of an AND-circuit 570 which generates a repeat scan signal on a line 572 thereby to cause the ORecircuit 550 to again trigger the scan pulse generator 552 to initiate an additional scan of the symbol response registers 482. The output complete signal on the line 534 is also applied to a delay circuit 574 which causes resetting of the scan 32 latch 554. The amount of delay is chosen to ensure that all the functions of character output complete signal on line 534 have been performed prior to the removal of the signal on the line 556; this is due to the fact that this signal, in FIG. 27, is applied to an inverter 576 which, through a delay circuit 578 will cause resetting of the counter 562 to zero. The delay 578 in turn ensures that the counter 562 will remain set to a count of 10 until the AND-circuit 568 (FIG. 26) is assured of operating the delay unit 574 for resetting the scan 32 latch 554.

In FIG. 26, the repeat scan AND-circuit 570 will operate only provided there is a signal from an OR-circuit 580 indicating the presence of any one of nine RESCAN CHAR 1 ... RESCAN CHAR 9 signals on related lines 530 ... 532. Referring to the response test circuit of FIG. 25, in any scan in which any symbol is read out to the output character registers 514, at least one of the latches 526 ... 528 will be set, and will thus indicate to the output period and scan circuitry of FIG. 26 that at least one more scan is required to ensure that there are no further symbols to be read out. This is the function of the OR-circuit 580.

The CHAR OUTPUT CMPLT signal on the line 534 is also applied in FIG. 26 to an AND-circuit 582 which can operate when all nine "no response" signals are present on the lines 500 ... 502. In other words, the AND-circuit 582 operates in a fashion complementary to the AND-circuit 570: when the output complete signal appears on line 534, one or the other of these AND-circuits will operate to cause an additional scan, or to reset the output period, thereby causing the latch 536 to once again generate the NOT OUTPUT PERIOD signal on line 386, which in turn permits the load cycle counter to advance from five to zero and thus be ready to handle another inquiry pair (as a result of words already loaded into the word buffers), or to handle subsequent inquiry or store operations (in the event that the currently handled inquiry pair are the last of a given inquire operation).

In FIG. 28 are illustrated the character encode matrices 510 and the output character registers 514. Each of the character encode matrices 510 comprises a suitable encoder, such a diode matrix, of any type known in the art which will provide a distinct five bit binary coded output on the lines 512 for any particular one of 32 possible inputs on the lines 508. This happens substantially simultaneously, so that a given symbol response on one of the lines 508 flushes through the one of the character encode matrices 510 relating to the particular character in which the symbol relates. The resulting five-bit binary code on the related five lines 512 will set corresponding latches of the output character registers 514. The output of the latches comprise binary coded character signals on related lines 516 which are applied to the output character gates 518 (FIG. 29). The output character registers 514 remain set until a reset signal appears on a line 590 in response to the receipt at an OR-circuit 592 of the CHAR OUTPUT CMPLT signal on the line 534. This signal will not appear until each of five characters have been read out serially onto the output lines 132 (FIG. 23, FIG. 29). If desired, the OUTPUT PRESET signal on line 484 may be applied to the OR-circuit 592 to ensure that the output character registers 514 are reset at the start of each inquire operation; this could be used if desired in order to ensure that the ungated latches 514 are not inadvertently left in a set condition as a result of any spurious noise signals which may occur over a period of time.

As illustrated in FIG. 29, the output character gate 518 comprises a plurality of AND-circuits 592–599 and a plurality of OR-circuits 600–602. Each of the AND-circuits 592–599 is connected to a related output character selection signal and to a related one of five-binary bits corresponding to the character which it represents. For instance, the AND-circuit 592 is responsive to an OUTPUT CHAR SEL 1 signal on one of the lines 564 and to binary bit zero on the related ones of the lines 516. Similarly, other character one AND-circuits 593, 594 respond to the character one selection signal. Each other of the nine characters have five AND-circuits: thus AND-circuits 596 ... 597 respond to the character two selection signal and AND-circuits 598 . . . 599 respond to the character nine selection signal. The output of the AND-circuits 592–599 are applied to five OR-circuits 600–602 the OR-circuits each collect related binary bits from the AND circuits. Thus the OR-circuit 600 responds to each of the AND-circuits 592. 596 ... 598 which relate to binary bit zero; the OR-circuit 603 responds to each of the AND-circuits 594, 597 ... 599 which relate to binary bit four. The output of the OR-circuits 600–602 comprise the response output signals on the trunk of five lines 132 which is applied to the printer 134 within the I/O console 120 (FIG. 1).

Whenever two words of a previously loaded triplet are used to inquire, then all of the characters of the third word of the triplet will be retrieved (except in some cases where a repeated symbol may have been stored only once, in cycle 4). However, because of the manner of retrieving, through elimination of cells which could not participate in the response, unwanted characters may be retrieved as well. In the embodiment herein, the symbol response registers of FIG. 24 are polled in an essentially alphabetical order by the scan pulse generator; thus, a first group of characters (which may comprise an actual word) may include a character other than a character of the response word, and one or two characters of the response word may be retrieved in a subsequent scanning of the symbol registers. For instance, consider the example illustrated in Tables 1 and 2 hereinbefore. If "HOG" and "DOCTOR" are used as an inquiry pair, then the response could possibly be:

TABLE 6

```
VELARINAR
  XTE  MRC
   M
```

In other words, the second, third, fourth, sixth, seventh and eighth character positions each receive multiple responses, the fourth character position receiving three responses. However, knowing that the symbol registers are readout in successive scans in alphabetical order, one realizes that the grouping of the first, second and third responses does not necessarily bear any relationship to the characters which should be assembled to form the response word. Also notice that the third and fourth characters are wrong in the first line, but the second, sixth, seventh and eighth characters are correct in the first line. However, one can quickly see that there are not too many words relating to the subject of "HOG" and "DOCTOR" other than the word "VETERINARIAN," which is truncated to "VETERINAR" as shown in Tables 1, 2 and 6. To verify the relationship, one could take either "HOG" or "DOCTOR" and form an inquiry pair with various possible words indicated in Table 6, to see which of these words will cause the other word ("DOCTOR" or "HOG") to result from an inquire operation. In fact, analysis of the invention thus far shows that Table 6 is an extreme situation, and normally only one or two extra characters should be expected.

In determining which response characters are correct, some assistance can be had by use of the end of word symbol (in cases where such a symbol appears in the output word). There is, of course, no assurance that the end of word symbol should appear in the output word, but when it precedes the first character of the word, then one may presume that the "*e*" is valid. This is a useful clue to the selection of the characters. For instance, consider the case where "DOCTOR" and "VETERINARIAN" are used as an inquiry pair; the result might be:

TABLE 7

HOA*e*COGMH
G H *e*

Since an "*e*" in character positions four and eight is followed by an "H" in character positions five and nine and preceded by a "G" in character positions three and seven, one immediately will suspect that the symbols A3, C5 and M8 are erroneous symbols and that the symbols G3, H5 and *e*8 are correct symbols. Of course, in dependence upon the utilization of the present invention, automated means, such as a full scale computer, with suitable inputs thereto, may be utilized in order to assist in the evaluation of outputs.

In a case where more words are loaded than are required for a single inquiry pair, the I/O console may be caused to advance an additional line space between the results of various inquiry pairs, leaving the output of successive scans from one inquiry pair to be in adjacent lines of the printed output.

As disclosed herein, the bidirectional random encoder 102 comprises a hard-wired, direct connection between symbol means, comprising symbol input lines 106 and symbol output lines 108, which are connected together (as at 158, FIGS. 3 and 4) at the symbol end of the trees 140 so as to form symbol lines, which carry both input and output signals. The bidirectional random encoder 102 is merely one embodiment of translation means which can relate the symbol input lines and the symbol output lines to the cells in a specific fashion. Reference to FIG. 2 illustrates that the inputs and outputs of the random encoder are related to the cells in subsets, and the cells in turn are related to the input symbol lines and output symbol lines in subsets as well. Thus, any one symbol will energize all of the outputs of one of the 1:125 trees 140, all of the outputs of which are fanned 1:5 by lines 144 and are spread among a plurality of 5:1 interconnection circuits 146. The 625 cells thereby reached comprise a subset of the entire set of cells which comprises the total memory. Similarly, due to the interconnection circuits 146, each cell relates to a subset (in this embodiment the subset equals five) of the symbol input or output lines 106, 108. This relationship is significant, although the actual numbers used (such as there being five symbols relating to each cell) may vary in accordance with design parameters for a particular utilization of the present invention.

Although shown here in the form of a bidirectional encoder 102, a translation means providing a similar relationship between the symbols and the cells may be comprised in other fashions. For instance, light pipes or fiber optics may be used to provide the desired relationship; also, computer software may be employed to select cells in a distinct coded fashion in dependence upon symbol inputs to the computer, and to similarly select symbols for output in dependence upon input signals from the cells. In fact, although computer programming has been employed to implement the translator in place of the random encoder 102 disclosed herein, because of the vast amount of hardware required and the length of time involved for such selection, it does not constitute the preferred embodiment. Some aspects of the software approach are described in my publication entitled: "A Lifelike Model for Associative Relevance," Proceedings of the International Joint Conference on Artificial Intelligence, 1696; pp. 271–280.

Each of the memory cells 150 is logical in the sense that it can react differently in dependence upon the totality of signals received thereat, and on a relatively permanent memory condition which it has previously assumed. As disclosed herein, the memory condition is the selected binary setting of the flip flop or latch 180. The memory condition is determinable to be either a set state or a reset state; however, other memory conditions, so long as they can be distinguished, may be employed. Similarly, successive signals on the cell line (such as the random bit line 189 disclosed herein) need not necessarily be counted in a counter; they may instead cause the repetitive setting of a suitably arranged delay multivibrator, such as to remain set in response to word one only long enough so that it can again be set for word two and word three in turn, but failure to receive any one word causing it to be unable to participate in the affirmative logic resulting from counts of input signals. In such case, loading of repeated symbols (as in cycle four herein) must be suitably accommodated.

The symbols employed herein reflect the nature of an encoded character within a given character position of the data source (such as the word buffers herein). This is convenient since it allows manipulation of words directly in the form of language, the internally coded result of the words bearing a direct relationship with the operator controlled input to the system through the character positions in the words. It is important that the coding relationship of words being loaded into memory is the same as the coding relationship in the output circuitry that forms output words in dependence upon those of the symbols which have not been eliminated by the cells having generated output signals during an output operation. The particular manner of encoding symbols, whether or not they relate to characters, is relatively insignificant to the invention, although it is known that the character position/character encoding of symbols used herein has certain advantages, particularly those relating to the direct correlation between the symbols and language.

The distinction between input commands and output commands is made herein on the basis of different polarities of signals on the same signal line 128. This is disclosed as a preferred way of commanding the logical operations within the cells, since a large number of cells are involved, and the utilization of a single line for input commands (store operation) and output or readout commands (inquire) is felt to be advantageous. Of course, this may be achieved on separate lines, or on the same line or set of lines with pulse code or other modulation or encoding in order to distinguish between the two commands in accordance with well-known techniques. Similar reasoning applies to the utilization of different polarity of signals for inputs through the translation means to the cells and outputs from the cells through the translation means to the output circuitry. As stated hereinbefore, instead of utilizing a single set of symbol means, including input symbol lines, connected to output symbol lines so as to form a single symbol line at the "outside world" side of the bidirectional random encoder and connecting to a single-cell line which enters the memory cell, separate symbol input and symbol output lines could be connected directly to the cell input line (such as at the counter 186) and a separate cell output line (such as at the output of the AND-circuit 194). Also, instead of polarity encoding, even if a unitary translator (such as the random encoder 102 disclosed herein) were used, it could be modified to use pulsewidth or other modulation or encoding to distinguish and separate the input signals from the output signals.

In the case where the embodiment of the invention includes a capability for receiving more than the given multiplet (a triplet herein) of input words on a store operation, or more than an inquiry multiplet of a lesser amount (a pair herein) on an inquire operation, then successive operations ensue, as controlled herein by control means, including the group counter. If desired, simplification of the apparatus may ensue by recognizing only two words for inquire operations; this eliminates the need to block further inquire operations from the same set of input words pending the handling of the total inquire response from a single pair of words permutated from the total number. Of course, the multiple permutations of input words by the apparatus may be eliminated entirely, so that for any given store or inquire operation, only one operation will result with a single group of words being loaded into storage, as described hereinbefore.

Since apparatus to convert from five-bit binary code at a given character position to a single-energized line is relatively simple (such as the symbol encoder 110 as disclosed herein), this has not been shown in detail. However, it should be appreciated that in a sense, the symbol encoder 10 includes a plurality of portions, each related to a character position of the selected one of the input word buffers, and the output of that portion provides a signal on a related portion of the symbol input lines to the bidirectional encoder 102. Thus, correspondence is maintained between a given character position of a word to be loaded in storage and the particular logical memory cells which can be reached thereby.

Although the invention has been described in terms of storage triplets and inquiry pairs, it should be understood that the given number of words of language used to cause a storage operation, and the lesser particular number of words used in an inquire operation may be chosen as desired without departing from the present invention.

For simplicity herein, the capacity of the input registers has been limited to nine characters, so that words in excess of nine characters are automatically truncated, and the fill means (including the fill register herein) repeats characters of shorter words until the currently filling input word register is filled to capacity. Of course, modifications may be made herein in accordance with the skill of the art to alter the particular means for achieving the uniform length of input words if desired. For instance, the well-known shift register may be utilized so as to provide filling to capacity through multiple shifts.

In the present embodiment, in the event that the operator supplies only two input words and then initiates a store operation, none of the AND-circuits 400–406 and FIG. 17 will operate, so that there will be no load control signals to the symbol input gate of FIG. 22, and nothing will happen. The only danger is that the operator will not know that a nullity operation has resulted; thus, if desired, another AND circuit similar to the AND-circuits 400–406 of FIG. 17 could be provided to cause the combination of a word count of two and "-begin store" to generate an alarm.

Of course, all of the parameters of the system may be changed to suit any desired alphabet, word-length or storage capacity.

Improved embodiments of the present invention may utilize logical inversion to convert unions of sets into intersections, and vice versa, without changing the basic mode of interaction among the sets, as is apparent from elementary set theory and the foregoing disclosure of a preferred embodiment of the invention. Further, although one aspect of the present invention is the direct application of words of language to the associative concepts of the present invention, the internal symbols of the system may be adapted to represent input-output elements other than the characters of ordinary language, such as written words; for example, the symbols might represent the phonemes of spoken words, or figure-attributes in a pattern-recognition application.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. Data processing apparatus comprising:

source means having a plurality of outputs and selectively presenting at said outputs successive groups of data signals in a sequence, each group directly corresponding to a word of language;

logical memory means comprising a plurality of cells, each of said cells responsive to a plurality of said source means outputs, each of said source means outputs related to a distinctive plurality of said cells, each of said cells responsive to receipt of a given number of data signals from said source means to assume a selected one of a plurality of memory conditions, each of said cells responsive to receipt of a distinct number of data signals from said source means and to its memory condition being other than said selected memory condition to generate an output signal; and output means having a plurality of inputs, each of said inputs responsive to a unique plurality of said cells, each of said cells related to a different plurality of said inputs, the interconnection between said cells and said inputs being the same as the interconnection between said cells and said source means outputs, said output means responsive to said cell output signals to generate a group of data signals relating to ones of said cells other than those generating output signals.

2. Data processing apparatus comprising:

command means to present either a store operation command manifestation or a readout operation command manifestation alternatively;

logical memory means, responsive to said command means, comprising a plurality of cells, each of said cells including means for receiving a date signal and for generating a cell output signal, each of said cells responsive to receipt of given plurality of data signals and to said store command manifestation to assume a selected one of a plurality of memory conditions, and responsive to receipt of a plurality of data signals less than said given plurality and to a memory condition other than said selected condition and to said readout command manifestation to generate said cell output signal; and means interconnected with said logical memory means for presenting data signals representative of a number of groups of data manifestations to selected ones of said cells in dependence upon said data manifestations, said number equal to said given plurality, and responsive to said cell output signals generated by said cells to generate, in dependence upon said cell output signals, at least a group of data manifestations relating to cells other than those of said cells generating said cell output signals.

3. Data processing apparatus according to claim 2 wherein said logical memory means includes a bistable device capable of assuming either one of two stable states, one of said stable states representing said selected memory condition.

4. Data processing apparatus according to claim 3 wherein said logical memory means further comprises:

counting means responsive to date signals received by said logical memory means to develop signals indicative of the number of data signals received thereby; and means responsive to said counting means and to the signals from said command means to control the setting of said bistable device to said determinable memory condition and to generate said cell output signal.

5. Data processing apparatus according to claim 2 wherein said logical memory means includes counting means responsive to said data signals for developing signals indicative of the number of data signals received thereat.

6. Data processing apparatus comprising:

command means to present either a store operation command manifestation or a readout operation command manifestation, alternatively;

logical memory means, responsive to said command means, comprising a plurality of cells, each of said cells including means for receiving an input signal and for generating an output signal, each of said cells responsive to receipt of a given number of input signals and to said store command manifestation to assume a selected one of a plurality of memory conditions, and responsive to receipt of a plurality of input signals less than said given number and to a memory condition other than said selected memory condition and to said readout command manifestation to generate an output signal;

a set of symbol lines each of said symbol lines connected to a subset of said cells, each of said cells being in more than one of said cell subsets, whereby each of said cell subsets overlaps with at least another one but less than all of said cell subsets;

input means for presenting in a sequence of times successive ones of a plurality of groups of input signals, each group presented to ones of said symbol lines selected in coded fashion in direct dependence upon a word of language, there being at least said given number of groups in said sequence; and means responsive to said output signals on said symbol lines to generate, in dependence upon said output signals, data signals coded to represent at least a portion of a word of language in direct dependence, conversely to the direct dependence in said input means, to ones of said symbol lines other than those having output signals.

7. Data processing apparatus comprising:

command means to present either a store operation command manifestation or a readout operation command manifestation alternatively;

logical memory means, responsive to said command means, comprising a plurality of cells, each of said cells including means for receiving an input signal and for generating an output signal, each of said cells responsive to receipt of a given number of input signals and to said store command manifestation to assume a selected one of a plurality of memory conditions, and responsive to receipt of a particular number of input signals, less than said given number, and to a memory condition other than said selected memory condition and to said readout command manifestation to generate an output signal;

a set of symbol means;

input means responsive to said command means for presenting in sequence of times preceding one of said operation command manifestations successive ones of a plurality of groups of input signals, each group presented to ones of said symbol means selected in coded fashion in direct dependence upon a word of language, there being at least said particular number of groups in said sequence related to a readout operation and at least said given number of groups in said sequence related to a store operation;

means for interrelating said set of symbol means and said cells, each of said symbol means related to a subset of said cells, an input signal at one of said symbol means causing an input signal at each cell of the related subset of cells, each of said cells being in more than one of said cell subsets, whereby each of said cell subsets overlaps with at least another one but less than all of said cell subsets, each of said cells related to a subset of said symbol means including each one of said symbol means related to a subset of said cells in which said cell is included, whereby the relationship between symbol input lines and cell input lines is the same as the relationship between symbol output lines and cell output lines, an output signal from one of said cells causing an output signal at each symbol means of the related subset of symbol means; and output means responsive to said output signals at said symbol means to generate, in dependence upon said output signals, data signals coded to represent at least a portion of a word of language in direct dependence, conversely to the direct dependence in said input means, to ones of said symbol means other than those receiving said output signals.

8. Data processing apparatus according to claim 7 wherein said input means comprises symbol encoding means having portions related to corresponding components of a word of language, each of said symbol encoding means portions corresponding to a portion of said set of symbol means, each of said symbol encoding means portions selecting symbol means from among the related portion of said set of symbol means in dependence upon the component of the word related to said encoding means portion.

9. Data processing apparatus according to claim 7 wherein said input means comprises symbol encoding means having portions related to corresponding character positions within a word of language, each of said symbol encoding means portions corresponding to a portion of said set of symbol means, each of said symbol encoding means portions selecting a particular one of the related portion of said set of symbol means in dependence upon the character of language appearing in the position of the word related to said encoding means portion.

10. Data processing apparatus according to claim 9 wherein said input means includes:

a plurality of input word registers for storing at least said given number of words of language in a coded fashion in a sequence of character positions; and means for comparing the data content of like character positions of each of the word registers;

said input means presenting input signals in said successive groups only to ones of said symbol means relating to character positions of each of said registers having a data content different from those of like character positions of other ones of said registers.

11. Data processing apparatus according to claim 10 wherein said input means includes means for presenting as an additional group of one or more input signals to said symbol means, one or more signals related only to character positions of any of said registers having a data content equal to the data content of a like character position of another one of said registers.

12. Data processing apparatus according to claim 7 wherein said input means includes:

a plurality of input word registers, each of said registers having a given character capacity;

means receiving, serially by character, coded manifestations of characters of successive words of language for storage in related, successive ones of said registers;

means for counting characters received; and fill means responsive to said character counting means to fill each of said registers to capacity by repeating, in sequence, character manifestations of the related word of language received thereby to the extent necessary to fill each of said input word registers to capacity.

13. Data processing apparatus according to claim 12 wherein said fill means includes a fill register adapted to receive characters in like manner as said input word registers and means for utilizing the contents of the fill register for filling each of said input word registers to capacity.

14. Data processing apparatus according to claim 7 wherein said output means comprises a plurality of symbol registers, one related to each of said symbol means such that an output signal at the related symbol means causes a resetting of the related symbol register, said output means including means to preset said symbol registers in timed relation with a readout operation command manifestation from said command means prior to receipt thereat of said output signals, said output means generating data signals coded to represent at least a portion of a word of language in direct dependence to ones of said symbol registers not reset by said output signals.

15. Data processing apparatus according to claim 7 wherein said input means includes:

a plurality of input word registers for storing a number of words of language in a coded fashion, said number being in excess of said given number;

means receiving coded manifestations of characters of successive words of language for storage in related, successive ones of said registers;

means for counting and presenting a count manifestation of the number of words received;

and further comprising:

control means including said command means responsive to said word counting means and to store operation command manifestation to control a sequence of successive operations of said input means, each of said operations presenting, in a sequence of times therein, successive ones of at least said given number of groups of input signals, said sequence of successive operations including one operation for each distinctive group of said given number of words that can be selected from the number of words of language indicated by said count manifestation.

16. Data processing apparatus according to claim 15 wherein said control means is further responsive to a readout operation command manifestation to provide a sequence of successive operations including one operation for each distinctive group of said particular number of words that can be selected from the number of words indicated by said count manifestation;

said control means further comprising means to control the commencing of successive ones of said sequence of operations in response to a readout operation command manifestation only following completion of operation of said output means.

* * * * *